United States Patent
Klemenz et al.

(10) Patent No.: US 11,093,220 B2
(45) Date of Patent: *Aug. 17, 2021

(54) GENERATING INTERFACES FROM DATA AND SERVICE DEFINITIONS FOR DEVELOPING APPLICATIONS

(71) Applicant: SAP SE, Walldorf (DE)

(72) Inventors: Oliver Klemenz, Sinsheim (DE); Tim Philipp Trabold, Reilingen (DE); Ulrich Bestfleisch, Schwetzingen (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,479

(22) Filed: Feb. 26, 2019

(65) Prior Publication Data

US 2020/0272434 A1     Aug. 27, 2020

(51) Int. Cl.
*G06F 8/35* (2018.01)
*G06F 8/41* (2018.01)
*G06F 16/22* (2019.01)

(52) U.S. Cl.
CPC .......... *G06F 8/35* (2013.01); *G06F 8/41* (2013.01); *G06F 16/2282* (2019.01)

(58) Field of Classification Search
CPC ..... G06F 8/35; G06F 8/38; G06F 8/31; G06F 8/41; G06F 16/2282
See application file for complete search history.

(56) References Cited

U.S. PATENT DOCUMENTS

| 8,843,945 | B2 | 9/2014 | Tran | |
| 9,892,414 | B1* | 2/2018 | Henry | G06Q 30/0617 |
| 10,579,372 | B1* | 3/2020 | Bahrami | G06N 20/00 |
| 10,678,522 | B1* | 6/2020 | Yerramreddy | G06F 8/41 |
| 2003/0110472 | A1 | 6/2003 | Alloing et al. | |
| 2004/0148586 | A1* | 7/2004 | Gilboa | G06F 3/0484 717/108 |
| 2006/0265697 | A1* | 11/2006 | Ali | G06F 8/75 717/141 |
| 2007/0255751 | A1* | 11/2007 | Bansal | G06F 8/10 |
| 2011/0029949 | A1* | 2/2011 | Adams | G06F 8/36 717/109 |

(Continued)

OTHER PUBLICATIONS

Klemenz, et al. Related Pending U.S. Appl. No. 16/285,562, filed Feb. 26, 2019.

(Continued)

*Primary Examiner* — Wei Y Zhen
*Assistant Examiner* — Brahim Bourzik
(74) *Attorney, Agent, or Firm* — Fountainhead Law Group P.C.

(57) ABSTRACT

Some embodiments provide a non-transitory machine-readable medium that stores a program. The program receives a data model definition defined using a human-readable syntax. The program further generates a machine-readable representation of the data model definition. Based on the data model definition, the program also generates a set of interfaces from the machine-readable representation of the data model definition. Each interface in the set of interfaces includes code specified in a programming language. The program further provides the set of interfaces to an integrated development environment (IDE) application for design-time implementation of the set of interfaces.

20 Claims, 14 Drawing Sheets

(56) References Cited

U.S. PATENT DOCUMENTS

| | | | |
|---|---|---|---|
| 2015/0363171 A1* | 12/2015 | Esfahany | G06F 40/205 |
| | | | 717/106 |
| 2016/0004516 A1* | 1/2016 | Ivanov | G06F 8/35 |
| | | | 717/106 |
| 2016/0291946 A1* | 10/2016 | Shi | G06F 9/44521 |
| 2018/0307464 A1* | 10/2018 | Bijani | G06F 8/36 |
| 2019/0004873 A1* | 1/2019 | Liu | G06F 16/35 |
| 2019/0339947 A1* | 11/2019 | McCune | G06F 8/30 |
| 2020/0301760 A1* | 9/2020 | Janakiraman | G06F 9/54 |
| 2020/0326916 A1* | 10/2020 | Sreenivasan | G06F 40/154 |
| 2021/0004209 A1* | 1/2021 | Holt | G06F 8/30 |

OTHER PUBLICATIONS

Klemenz, et al. Related Pending U.S. Appl. No. 16/285,623, filed Feb. 26, 2019.

* cited by examiner

```
define entity Employee {
  key ID : Integer;
  name : String;
  jobTitle : String;
}
```

```
{
  "definitions": {
    "Employee": {
      "kind": "entity",
      "elements": {
        "ID": {
          "key": true,
          "indexNo": 1,
          "type": "cds.Integer"
        },
        "name": {
          "indexNo": 2,
          "type": "cds.String"
        },
        "jobTitle": {
          "indexNo": 3,
          "type": "cds.String"
        },
      },
```

```
export interface EmployeeType {
  ID?: number,
  name?: string,
  jobTitle?: string,
}
```

```
using employee from './employee';
service Service {
  entity Employee as projection on employee.Employee actions {
    action promoteEmployee(employeeID:Integer) returns Boolean;
  }
}
```

```
{
  "definitions": {
    "Service": {
      "kind": "service",
      "@source": "service.cds"
    },
    "Service.Employee": {
      "kind": "entity",
      "actions": {
        "promoteEmployee": {
          "kind": "action",
          "params": {
            "employeeID": {
              "kind": "param",
              "indexNo": 1,
              "type": "cds.Integer"
            }
          },
          "returns": {
            "type": "cds.Boolean"
          }
        }
      },
      "source": "employee.Employee",
      "elements": {
        "ID": {
          "origin": "employee.Employee..ID",
          "indexNo": 1,
          "value": {
            "=": "Employee.ID"
          },
          "key": true,
          "type": "cds.Integer"
        },
        "name": {
          "origin": "employee.Employee..name",
          "indexNo": 2,
          "value": {
            "=": "Employee.name"
          },
          "type": "cds.String"
        },
        "jobTitle": {
          "origin": "employee.Employee..jobTitle",
          "indexNo": 3,
          "value": {
            "=": "Employee.jobTitle"
          },
          "type": "cds.String"
        }
      }
    },
    "employee.Employee": {
      // not relevant
    }
  }
}
```

FIG. 6

```
export namespace Employee { export interface PromoteEmployeeParametersType {
    employeeID?: number,
  } export interface Facade {
    promoteEmployee?(parameters?: PromoteEmployeeParametersType): Promise<boolean>;
  }
}
```

FIG. 7

```
using employee from './employee';

service Service {

@AOF.Context: "Service.Employee"
  action hireEmployee() returns Boolean;

@AOF.Object
  entity Employee as projection on employee.Employee actions {
    @AOF.Execute: "promoteEmployee"
    action promoteEmployee(employeeID:integer) returns Boolean;
  }
}
```

```
{
  "definitions": {
    "Service": {
      "kind": "service",
      "@source": "service.cds"
    },
    "Service.hireEmployee": {
      "kind": "action",
      "returns": {
        "type": "cds.Boolean"
      },
      "@AOF.Context": {
        "=": "Service.Employee"
      }
    },
    "Service.Employee": {
      "kind": "entity",
      "actions": {
        "promoteEmployee": {
          "kind": "action",
          "params": {
            "employeeID": {
              "kind": "param",
              "indexNo": 1,
              "type": "cds.Integer"
            }
          },
          "returns": {
            "type": "cds.Boolean"
          },
          "@AOF.Execute": {
            "=": "promoteEmployee"
          }
        }
      }
    },
```

```
"@AOF.Object": true,
"source": "employee.Employee",
"elements": {
  "ID": {
    "origin": "employee.Employee..ID",
    "indexNo": 1,
    "value": {
      "=": "Employee.ID"
    },
    "key": true,
    "type": "cds.Integer"
  },
  "name": {
    "origin": "employee.Employee..name",
    "indexNo": 2,
    "value": {
      "=": "Employee.name"
    },
    "type": "cds.String"
  },
  "jobTitle": {
    "origin": "employee.Employee..jobTitle",
    "indexNo": 3,
    "value": {
      "=": "Employee.jobTitle"
    },
    "type": "cds.String"
  }
},
"employee.Employee": {
  "kind": "entity",
  "elements": {
    "ID": {
      "key": true,
      "indexNo": 1,
      "type": "cds.Integer"
    },
    "name": {
      "indexNo": 2,
      "type": "cds.String"
    },
    "jobTitle": {
      "indexNo": 3,
      "type": "cds.String"
    }
  }
},
}
```

FIG. 10B

```
export namespace Employee { export type Data = EmployeeEntity.Data;

export type Key = EmployeeEntity.Key;

export interface PromoteEmployeeParametersType {
    employeeID?: number,
  } export interface HireEmployeeParametersType {
    name?: string,
    jobTitle?: string,
  } export async function facade(context: AOF.Context | AOF.CallerContext): Promise<Facade> {
    return await (AOF._.isFunction((context as any).getApplicationObject) ? (context as AOF.Context).getApplicationObject(Name) : AOF.getApplicationObject(Name, context as AOF.CallerContext)) as Facade;
  } export interface Facade extends AOF.ApplicationObject<Key, Data> { promoteEmployee?(key: Key, parameters?: PromoteEmployeeParametersType, sConcurrencyToken?: string): Promise<boolean>;

hireEmployee?(parameters?: HireEmployeeParametersType): Promise<EmployeeType>;

nodes(): {
      Root: AOF.ApplicationObjectNode<Key, Data>
    };
  } export interface Exits { definition?(): AOF.Definition<Key, Data>;

promoteEmployee({ key, parameters, data: employee, message, context, metadata }: AOF.CDS.ActionExecute<Key, Data, Employee.PromoteEmployeeParametersType>): Promise<boolean>;

hireEmployee({ parameters, message, context, metadata }: AOF.CDS.StaticActionExecute<Key, Data, Employee.HireEmployeeParametersType>): Promise<EmployeeType>;

```
export default class EmployeeImpl implements Employee.Exits { async promoteEmployee({key, parameters, data: employee, message, context, metadata}:
    AOF.CDS.ActionExecute<Employee.Key, Employee.Data, Employee.PromoteEmployeeParametersType>):
    Promise<boolean> {
        return;
    } async hireEmployee({parameters, message, context, metadata}:
    AOF.CDS.StaticActionExecute<Employee.Key, Employee.Data, Employee.HireEmployeeParametersType>):
    Promise<EmployeeType> {
        return;
    }
}
```

GENERATING INTERFACES FROM DATA AND SERVICE DEFINITIONS FOR DEVELOPING APPLICATIONS

BACKGROUND

Application programming models allow developers to create applications. For example, some application programming models offer an end-to-end programming model that includes languages, libraries, and APIs tailored for full-stack development. Applications can be coded using a variety of different programming languages (e.g., Java, C++, etc.). In addition, any number of different Integrated Development Environments (IDEs) may be used to create and write applications. After an application is developed, it may be executed in a runtime environment. Different runtime environments can be used to execute developed applications. For instance, an application developed using Java can be executed in a Java runtime environment while an application developed using JavaScript can be executed in a JavaScript runtime environment.

SUMMARY

In some embodiments, a non-transitory machine-readable medium stores a program. The program receives a data model definition defined using a human-readable syntax. The program further generates a machine-readable representation of the data model definition. Based on the data model definition, the program also generates a set of interfaces from the machine-readable representation of the data model definition. Each interface in the set of interfaces includes code specified in a programming language. The program further provides the set of interfaces to an integrated development environment (IDE) application for design-time implementation of the set of interfaces.

In some embodiments, the program may further receive, through the IDE, additional code specified in the programming language comprising a set of operations for an interface in the set of interfaces. The data model definition may further specify a service entity definition that includes a function associated with a data entity definition in the set of data entity definitions. The program may further generate a namespace for the service entity definition that includes a façade interface and receive, through the IDE, additional code from the programming language comprising a set of operations for the façade interface.

In some embodiments, the programming language may be a first programming language. The program may further transcompile the code from the first programming language to a second programming language. The first programming language may be a strongly-typed programming language and the second programming language may be a weakly-typed programming language. The transcompiled code may be configured for server-side execution on a computing device.

In some embodiments, the data model definition may specify a set of data entity definitions. Each data entity definition in the set of data entity definitions may specify a set of attributes and a set of data types associated with the set of attributes. The program may further deploy the data model definition to a database. Deploying the data model definition to the database may include, for each data entity definition in the set of data entity definitions, creating a table in the database comprising a set of columns. Each column in the set of column may be for an attribute in the set of attributes specified in the data entity definition.

In some embodiments, a method, executable by a device, receives a data model definition defined using a human-readable syntax. The method further generates a machine-readable representation of the data model definition. Based on the data model definition, the method also generates a set of interfaces from the machine-readable representation of the data model definition, each interface in the set of interfaces comprising code specified in a programming language. The method further provides the set of interfaces to an integrated development environment (IDE) application for design-time implementation of the set of interfaces.

In some embodiments, the method may further receive, through the IDE, additional code specified in the programming language comprising a set of operations for an interface in the set of interfaces. The data model definition may further specify a service entity definition that includes a function associated with a data entity definition in the set of data entity definitions. The method may further generate a namespace for the service entity definition that includes a façade interface and receive, through the IDE, additional code from the programming language comprising a set of operations for the façade interface.

In some embodiments, the programming language may be a first programming language. The program may further transcompiling the code from the first programming language to a second programming language. The first programming language may be a strongly-typed programming language. The second programming language may be a weakly-typed programming language. The transcompiled code may be configured for server-side execution on a computing device.

In some embodiments, the data model definition may specify a set of data entity definitions. Each data entity definition in the set of data entity definitions may specify a set of attributes and a set of data types associated with the set of attributes. The method may further deploy the data model definition to a database. Deploying the data model definition to the database may include, for each data entity definition in the set of data entity definitions, creating a table in the database that includes a set of columns Each column in the set of column may be for an attribute in the set of attributes specified in the data entity definition.

In some embodiments, a system includes a set of processing units and a non-transitory machine-readable medium that stores instructions. The instructions cause at least one processing unit to receive a data model definition defined using a human-readable syntax. The instructions further cause the at least one processing unit to generate a machine-readable representation of the data model definition. Based on the data model definition, the instructions also cause the at least one processing unit to generate a set of interfaces from the machine-readable representation of the data model definition, each interface in the set of interfaces comprising code specified in a programming language. The instructions further cause the at least one processing unit to provide the set of interfaces to an integrated development environment (IDE) application for design-time implementation of the set of interfaces.

In some embodiments, the instructions may further cause the at least one processing unit to receive, through the IDE, additional code specified in the programming language comprising a set of operations for an interface in the set of interfaces. The data model definition may further specify a service entity definition comprising a function associated with a data entity definition in the set of data entity definitions. The instructions may further cause the at least one processing unit to generate a namespace for the service entity definition that includes a façade interface and receive, through the IDE, additional code from the programming language comprising a set of operations for the façade interface.

In some embodiments, the programming language may be a first programming language. The instructions may further cause the at least one processing unit to transcompile the code from the first programming language to a second programming language. The first programming language may be a strongly-typed programming language. The second programming language may be a weakly-typed programming language. The transcompiled code may be configured for server-side execution on a computing device.

The following detailed description and accompanying drawings provide a better understanding of the nature and advantages of the present invention.

BRIEF DESCRIPTION OF THE DRAWINGS

FIG. 2 illustrates an example data model definition that includes a data entity definition according to some embodiments.

FIG. 3 illustrates a machine-readable representation of the data model definition illustrated in FIG. 2 according to some embodiments.

FIG. 4 illustrates a TypeScript interface for the data entity definition illustrated in FIG. 2 according to some embodiments.

FIG. 5 illustrates an example service entity definition according to some embodiments.

FIG. 6 illustrates a machine-readable representation of the service entity definition illustrated in FIG. 5 according to some embodiments.

FIG. 7 illustrates a TypeScript namespace for the service entity definition illustrated in FIG. 5 according to some embodiments.

FIG. 9 illustrates an example annotated service entity definition according to some embodiments.

FIGS. 10A and 10B illustrate a machine-readable representation of the service entity definition illustrated in FIG. 9 according to some embodiments.

FIG. 11 illustrates TypeScript interfaces generated for the service entity definition illustrated in FIG. 9 according to some embodiments.

FIG. 12 illustrates TypeScript implementation classes generated for the service entity definition illustrated in FIG. 9 according to some embodiments.

DETAILED DESCRIPTION

Figure 1:
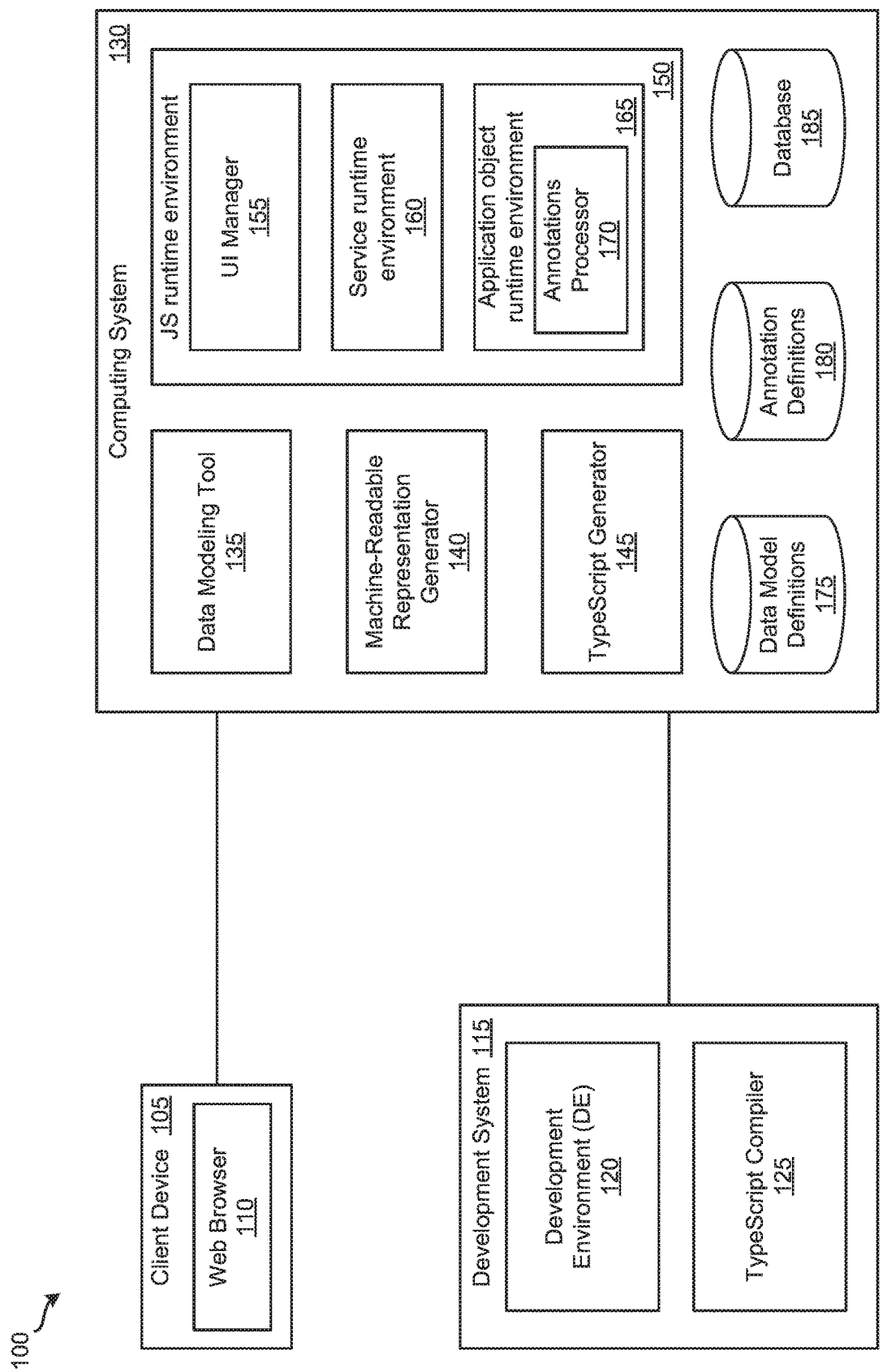
FIG. 1 illustrates a system according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for generating interfaces from data and service definitions for developing applications. In some embodiments, a computing system includes a data modeling tool for defining data model definitions of data entities and service entities in a human-readable syntax. Once a data model definition is defined, the computing system may generate a machine-readable representation of the data model definition. Based on the machine-readable representation of the data model definition, the computing system can generate interfaces in a strongly-typed programming language. These interfaces can be provided to a development system for further implementation (e.g., by a developer using a development environment (DE)) during design-time. The implemented interfaces can be transcompiled into another programming language, compiled, and executed. In some embodiments, the other programming language is a weakly-typed programming language. Thus, these techniques provide strongly-typed support for a weakly-typed programming language.

In addition, described herein are techniques for generating interfaces for application objects for developing applications. In some embodiments, a computing system includes a data modeling tool for defining data model definitions of application object entities in a human-readable syntax and annotating the application object entities with application object specific annotations. After defining a data model definition, the computing system may generate a machine-readable representation of the data model definition. Based on the machine-readable representation of the data model definition, the computing system can generate interfaces in a strongly-typed programming language for the application object entities. These interfaces can be provided to a development system for further implementation (e.g., by a developer using a development environment (DE)) during design-time.

Lastly, described herein are techniques for executing entities and services in an application object runtime environment. In some embodiments, a computing system may include a server-side runtime environment that includes an annotation processor. The annotation processor facilitates the execution of entities annotated with data modeling annotations as well as application object specific data modeling annotations. Entities annotated with application object specific data modeling annotations in a fully automated way within a runtime environment configured for entities annotated with data modeling annotations and a runtime environment configured for entities annotated with application object specific data modeling annotations. This way, any data modeling entity can act as an application object data modeling entity during runtime.

FIG. 1 illustrates a system according to some embodiments. As shown, FIG. 1 includes client device 105, development system 115, and computing system 130. Client device 105 is configured to communicate and interact with computer system 130. For example, during design-time, a user of client device 105 may access data modeling tool 135 hosted on computing system 130 via web browser 110. Using data modeling tool 135, the user of client device 105 may define data model definitions using a human-readable syntax. In some embodiments, a data model definition may include a set of data entity definitions, a set of service entity definitions, a set of application object definitions, or any combination thereof. A data entity definition can specify a set of attributes and a set of data types associated with the set of attributes.

In some embodiments, a data entity is a structured type representing sets of data that can be read and manipulated using create, read, update, and delete (CRUD) operations. In some embodiments, a data entity can be a table in a database and each attribute of the data entity can be a column in the table in the database. A service entity definition may include a set of functions. Each function may be associated with a data entity definition. In addition, during runtime, a user of client device 105 can also send, via web browser 110, requests to computing system 130 to execute application objects that have been implemented during design-time. The user of client device 105 may receive from computing system 130 results and/or responses to such requests through web browser 110.

As illustrated in FIG. 1, development system 115 includes development environment (DE) 120 and TypeScript compiler 125. In some embodiments, DE 120 is a software application that provides tools (e.g., a source code editor, build tools, a debugger, etc.) to a developer for developing software. DE 120 can be any number of different development environments including integrated development environments (IDEs), such as Microsoft Visual Studio, JetBrains Webstorm, Adobe Brackets, etc. TypeScript compiler 125 is configured to generate JavaScript code from TypeScript code. For example, TypeScript compiler 125 may compile source code of an application written in TypeScript (e.g., developed using DE 120) and output source code for the application written JavaScript.

While FIG. 1 shows DE 120 and TypeScript compiler 125 as part of one system (i.e., development system 115), one of ordinary skill in the art will appreciate that DE 120 and TypeScript compiler 125 can be implemented in separate systems. For instance, DE 120 may be implemented on development system 15 and TypeScript compiler 125 may be implemented on computing system 130 or another, different computing system. In some embodiments, DE 120 and TypeScript compiler 125 can be implemented on computing system 130. In some such embodiments, a client device (e.g., client device 105) may be used to access DE 120 and TypeScript compiler 125 to develop software. In some embodiments, a JavaScript programming language is a dynamic, weakly typed, prototype-based and multi-paradigm programming language. In some such embodiments, a Typescript programming language is a superset of the JavaScript programming language that adds static typing.

As illustrated, computing system 130 includes data modeling tool 135, machine-readable representation generator 140, TypeScript generator 145, JavaScript (JS) runtime environment 150, data model definitions storage 175, annotations definitions storage 180, and database 185. Data model definitions storage 175 is configured to store data model definitions defined using data modeling tool 135. Annotations definitions storage 180 is configured to store annotation definitions. In some embodiments, an annotation definition defines an annotation service runtime environment 160 or application object runtime environment 165. Examples of annotation definitions of annotations defined for application object runtime environment 165 are illustrated below in Appendix A. Database 185 is configured to store data, such as data entities defined by data model definitions stored in data model definitions storage 175.

In some embodiments, data model definitions storage 175 and annotation definitions storage 180 are implemented in a single physical storage while, in other embodiments, data model definitions storage 175 and annotation definitions storage 180 may be implemented across several physical storages. While FIG. 1 shows data model definitions storage 175 and annotation definitions storage 180 as part of computing system 130, one of ordinary skill in the art will appreciate that data model definitions storage 175 and/or annotation definitions storage 180 may be external to computing system 130 in some embodiments.

Data modeling tool 135 provides a tool for defining data model definitions (e.g., a Core Data and Services (CDS) tool provided by SAP Cloud Platform). For example, data modeling tool 135 may from client device 105 receive a request to use the tool. In response, data modeling tool 135 provides the tool to client device 105. When data modeling tool 135 receives a data model definition from client device 135, data modeling tool 135 stores it in data model definitions storage 175. Data modeling tool 135 can also send the data model definition to machine-readable representation generator 140. In some embodiments, a data model definition that includes data entity definitions may be deployed to database 185 by creating, for each data entity definition in the data model definition, a table in database 185 that includes a set of columns. Each column in the set of column is for an attribute specified in the data entity definition.

Machine-readable representation generator 140 is configured to generate machine-readable representations of data model definitions. For instance, machine-readable representation generator 140 can receive a data model definition from data modeling tool 135. In response, machine-readable representation generator 140 generates a machine-readable representation of the data model definition. In some embodiments, a machine-readable representation of a data model definition is based on a JavaScript Object Notation (JSON) format. Once machine-readable representation generator 140 has generated a machine-readable representation of the data model definition, machine-readable representation generator 140 sends it to TypeScript Generator 145. In some embodiments, machine-readable representation generator 140 may store it in data model definitions storage 175.

TypeScript generator 145 is responsible for generating TypeScript code from machine-readable representations of data model definitions. For example, TypeScript generator 145 can receive a machine-readable representation of a data model definition from machine-readable representation generator 140. In response, TypeScript generator 145 generates TypeScript code based on the machine-readable representation of the data model definition. The generated TypeScript code may be provided to development system 115 for further implementation.

In some embodiments, JS runtime environment 150 is a server-side JavaScript run-time environment (e.g., a node.js runtime environment) that is configured to execute applications coded in JavaScript. As shown in FIG. 1, JS runtime environment 150 includes user interface (UI) manager 155, service runtime environment 160, and application object runtime environment 165. UI manager 155 is configured to provide UIs to client device 105. In addition, UI manager 115 also receives requests from client device 105 for execution of application objects (e.g., create, read, update, or delete data in application objects) in application object runtime environment 165. When UI manager 115 receives such request, UI manager 115 sends them to service runtime environment 160 for processing.

Service runtime environment 160 is a runtime environment that serves as a service interface to UI manager 155 (e.g., a Core Data and Services (CDS) runtime environment provided by SAP Cloud Platform). For example, service runtime environment 160 maps UI calls and operations received from UI manager 155 to operations to database 185. In some embodiments, such operations to database 185 are limited to CRUD operations and other convenience functions on entities stored in database 185.

Application object runtime environment 165 is a runtime environment for operating on application objects. In some embodiments, application object runtime environment 165 is a persistency framework for JavaScript and/or JSON objects based on a JavaScript runtime environment (e.g., Node.js) supporting different technologies (e.g., SAP Hana XS Advanced and SAP UI5). Application object runtime environment 165 provides the runtime for an object declaration file to model business objects as aggregation of hierarchical nodes, mapped to data model entities (e.g., tables in database 185). Application logic of application objects can be described by defining so determinations, checks and actions to express the semantic of it. Metadata and properties of application objects describe the structural representation. As shown, application object runtime environment 165 includes annotations processor 170. Annotations processor 170 is configured to process application object specific annotations.

FIG. 1 illustrates data modeling tool 135, machine-readable representation generator 140, TypeScript generator 145, JavaScript (JS) runtime environment 150 as part of computing device 130. One of ordinary skill in the art will understand that different components can be implemented on different computing systems. For example, data modeling tool 135, machine-readable representation generator 140, and TypeScript generator 145 may be implemented on one computing system while JS run-time environment 150 can be implemented on another computing system.

Generation of TypeScript Interfaces for Data Entity Definitions

An example operation will now be described by reference to FIGS. 2-4. FIG. In particular, this example operation illustrates generation of a TypeScript interface for a data entity specified in a data model definition. The example operation starts by a user of client device 105 accessing data modeling tool 135 of computing system 130 via web browser 110 to create a data model definition. The data model definition defined in this example is illustrated in FIG. 2. FIG. 2 illustrates an example data model definition 200 that includes a data entity definition according to some embodiments. As shown, data model definition 200 includes a definition for an Employee data entity. The Employee data entity includes an attribute named "key ID", which is specified as an Integer data type, an attribute named "name", which is specified as a String data type, and an attribute named "jobTitle", which is specified as a String data type. Once, the user of client device 105 has finished creating data model definition 200, data modeling tool 135 sends data model definition 200 to machine-readable representation generator 140. Data modeling tool 135 may also store data model definition 200 in data model definitions storage 175.

Upon receiving data model definition 200, machine-readable representation generator 140 generates a machine-readable representation of data model definition 200. FIG. 3 illustrates a machine-readable representation 300 of the data model definition illustrated in FIG. 2 according to some embodiments. In this example, machine-readable representation 300 is a JSON-based representation of data model definition 100. Next, machine-readable representation generator 140 sends machine-readable representation 300 to TypeScript generator 145.

When TypeScript generator 145 receives machine-readable representation 300, TypeScript generator 145 generates TypeScript interfaces based on the machine-readable representation 300. To generate TypeScript interfaces based on a machine-readable representation of a data model definition, TypeScript generator 145 filters the machine-readable representation for data entity definition and/or data type definitions. For each data entity definition or data type definition, TypeScript generator 145 generates a TypeScript interface using the name of the data entity in the data model definition as the name of the TypeScript interface. Next, TypeScript generator 145 checks whether the entity definition or type definition extends another entity definition or type definition. If so, TypeScript generator 145 configures the generated TypeScript interface to extend the other (later generated) TypeScript interfaces based on the declared inheritance. Next, TypeScript generator 145 iterates through elements of the entity definition or type definition. For each element, TypeScript generator 145 checks whether the element is inherited from another entity definition or type definition. If so, TypeScript generator 145 does not generate the element. Otherwise, TypeScript generator 145 generates the element. Then, TypeScript generator 145 checks whether the elements type is a primitive data type. In some embodiments, a primitive data type is a data type that can be mapped to a TypeScript primitive data type. TypeScript generator 145 maps primitive data types to corresponding TypeScript primitive data types. The following Table 1 provides examples of mappings between primitive data types and TypeScript primitive data types:

TABLE 1

| Data Definition Type | Typescript Type |
| --- | --- |
| cds.UUID | string |
| cds.Boolean | boolean |
| cds.Integer | number |
| cds.Integer64 | number |
| cds.Decimal | number |
| cds.DecimalFloat | number |
| cds.Double | number |
| cds.Date | string |
| cds.Time | string |
| cds.DateTime | string |
| cds.Timestamp | string |
| cds.String | string |
| cds.Binary | ArrayBuffer |
| cds.LargeString | string |
| cds.LargeBinary | ArrayBuffer |

If the element type is not a primitive data type, then TypeScript generator 145 determines that the element type is a complex type. If TypeScript generator 145 determines that the complex type is a composition of other entities, TypeScript generator 145 determines that the TypeScript type is an array. Then, TypeScript generator 145 distinguish between complex type references and inline defined complex types (Struct types or Enum types). TypeScript generator 145 maps type references to the name of the referenced type (which can be generated later on or was generated earlier). Type references can also point to globally available Enums in contrast to inline defined Enums which are just available in context of the defining entity. Global Enums are also globally available in TypeScript. TypeScript generator 145 generates inline defined Enums into a namespace encapsulation which mirrors the entity definition in the data model definition. TypeScript generator 145 generates Enum types defined types as TypeScript Enums. The TypeScript interface name of them are referenced as the type for the element.

FIG. 4 illustrates a TypeScript interface 400 for the data entity definition illustrated in FIG. 2 according to some embodiments. For this example, TypeScript generator 145 uses the technique described to generate TypeScript interface 400 for the Employee date entity definition based on machine-readable representation 300. As shown, the entity name in data model definition 200 is used as the name of TypeScript interface 400. Also, TypeScript generator 145 maps the element types to respective TypeScript primitive data types according to Table 1. After generating TypeScript interface 400, TypeScript generator 145 may provide TypeScript interface 400 to development system 115 for further design-time implementation.

Generation of TypeScript Interfaces for Service Entity Definitions

Another example operation will now be described by reference to FIGS. 1-3, and 5-7. FIG. Specifically, this example operation illustrates generation of a TypeScript interface for a service entity specified in a data model definition. The example operation starts by a user of client device 105 accessing data modeling tool 135 of computing system 130 via web browser 110 to create a data model definition. The data model definition defined in this example includes the Employee data entity definition illustrated in FIG. 2 as well as a service entity definition. In some embodiments, a service entity definition defines service interfaces as collections of exposed entities enclosed in a service block. In some such embodiments, the entities exposed by a service entity definition are projections on entities from underlying data models. A service definitions may additionally specify one or more actions and/or functions with a comma-separated list of named and typed inbound parameters and an optional response type, which can be a reference to a declared type.

FIG. 5 illustrates an example service entity definition 500 according to some embodiments. Specifically, service entity definition 500 is the service entity definition defined for this example. As illustrated, service entity definition 500 is a service block definition for the Employee data entity defined in data model definition 200. Service entity definition 500 includes an exposure of an entity projection on the employee data entity model. Also, a bound action to the employee entity is defined that takes an employee's ID as a parameter and returns a Boolean value indicating whether the action failed or succeeded.

When machine-readable representation generator 140 receives the data model definition, which includes the Employee data entity definition illustrated in FIG. 2 and service entity definition 500, machine-readable representation generator 140 generates a machine-readable representation of the data model definition. As mentioned above, FIG. 3 illustrates a machine-readable representation 300 of the Employee data entity definition illustrated in FIG. 2. FIG. 6 illustrates a machine-readable representation 600 of the service entity definition illustrated in FIG. 5 according to some embodiments. For this example, machine-readable representation 600 is a JSON-based representation of the data model definition. Next, machine-readable representation generator 140 sends machine-readable representations 300 and 500 to TypeScript generator 145.

Once TypeScript generator 145 receives machine-readable representations 300 and 500, TypeScript generator 145 generates TypeScript interfaces based on the machine-readable representations 300 and 500. The generation of a TypeScript interface for the Employee data entity definition is explained above. TypeScript generator 145 generates TypeScript interfaces based on a machine-readable representation of a service entity definition by filtering machine-readable representation 600 for service entity definitions. For each service entity definition, TypeScript generator 145 generates a TypeScript namespace, which includes a Façade interface, using the name of the service entity as namespace identifier. Then, TypeScript generator 145 iterates through actions of the service entity definition. For each action, TypeScript generator 145 generates a TypeScript function in the Façade interface using the name of the action. To provide types for the parameters in the TypeScript function, TypeScript generator 145 extracts the parameters from the action and generates a parameter type interface that includes the action parameters, which are mapped to TypeScript data types, as members of the parameter type interface.

If TypeScript generator 145 determines that the result type is not a primitive data type, TypeScript generator 145 determines that the result type is a complex type. Next, TypeScript generator 145 determines whether the result type was previously generated. If so, TypeScript generator 145 references the previously generated type as a promisified return type of the action function. Otherwise, TypeScript generator 145 generates an interface for the result type in the context of the service entity namespace. TypeScript generator 145 then references the generated result type interface as a promisified return type of the action function.

FIG. 7 illustrates a TypeScript namespace 700 for the service entity definition illustrated in FIG. 5 according to some embodiments. In this example, TypeScript generator 145 uses the technique described to generate TypeScript namespace 700 for the service entity definition based on machine-readable representation 600. As illustrated, the name of the service entity in service entity definition 500 is used as the namespace identifier of TypeScript namespace 700. In addition, TypeScript namespace 700 includes a Façade interface, which includes a function for the promoteEmployee action specified in service entity definition 500. Lastly, TypeScript namespace 700 also includes a parameter type interface (i.e., interface PromoteEmployeeParameterType) that includes the action parameters, which have been mapped to TypeScript data types (e.g., using Table 1 above), as member as members of the parameter type interface. After generating namespace 700, TypeScript generator 145 may provide namespace 700 to development system 115 for further design-time implementation (e.g., further implementation of the Façade interface).

Figure 8:
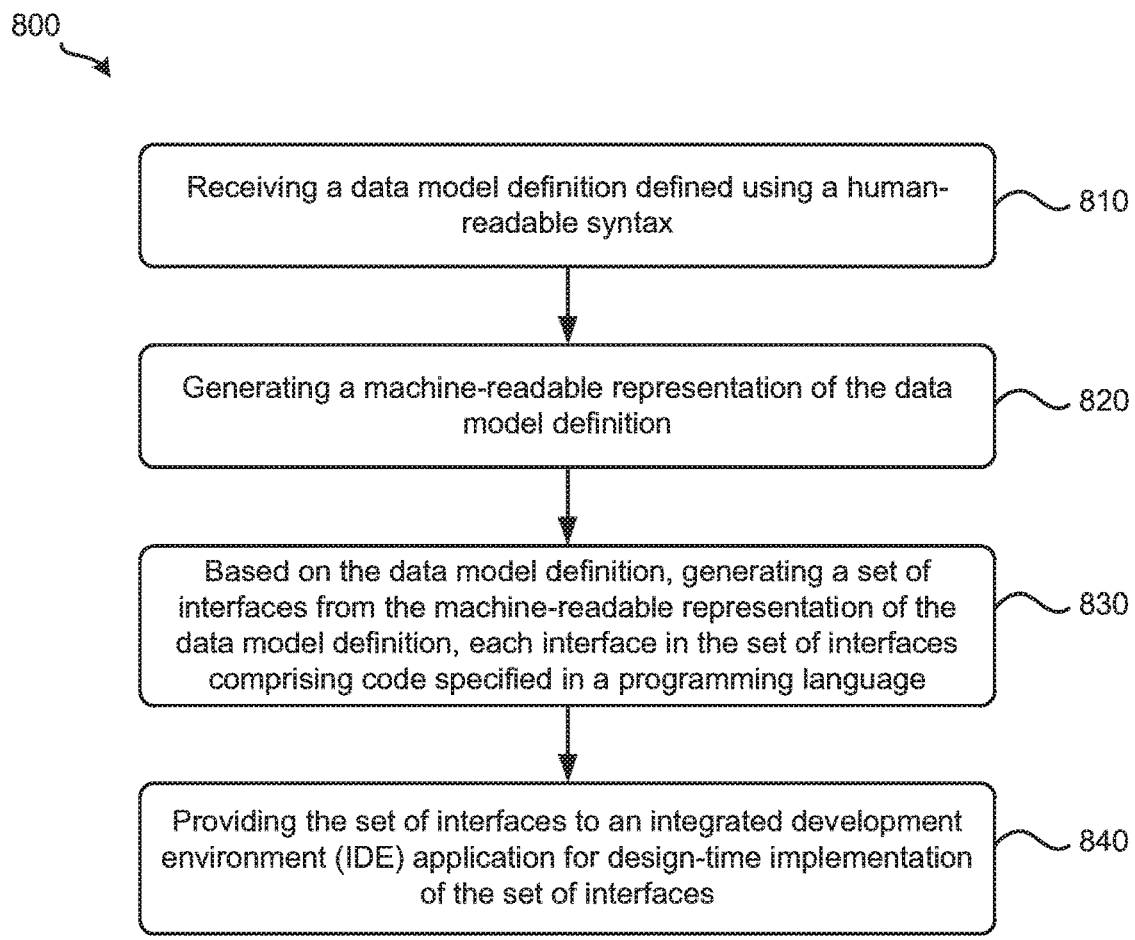
FIG. 8 illustrates a process for generating interfaces for data entity definitions according to some embodiments.

FIG. 8 illustrates a process 800 for generating interfaces for data entity definitions according to some embodiments. In some embodiments, computing system 130 performs process 800. Process 800 starts by receiving, at 810, a data model definition defined using a human-readable syntax. Referring to FIGS. 1 and 2 as an example, computing system 130 may receive from a user of client device 105 a data model definition (e.g., data model definition 200) created with data modeling tool 135.

Next, process 800 generates, at 820, a machine-readable representation of the data model definition. Referring to FIGS. 1-3 as an example, machine-readable representation generator 140 can generate the machine-readable representation (e.g., machine-readable representation 300) of the data model definition (e.g., data model definition 200) when machine-readable representation generator 140 receives the data model definition from data modeling tool 135.

Based on the data model definition, process 800 then generates, at 830, a set of interfaces from the machine-readable representation of the data model definition. Each interface in the set of interfaces includes code specified in a programming language. Referring to FIGS. 1 and 4 as an example, TypeScript generator 145 may generate the set of interfaces (e.g., TypeScript interface 400) from the machine-readable representation (e.g., machine-readable representation 300) of the data model definition (e.g., data model definition 200).

Finally, process 800 provides, at 840, the set of interfaces to an integrated development environment (IDE) application for design-time implementation of the set of interfaces. Referring to FIG. 1 as an example, computing system 130 can provide the set of interfaces (e.g., TypeScript interface 400) to development system 115 so that a developer using development system 115 may implement the set of interfaces during design-time.

Generation of TypeScript Interfaces for Annotated Entity Definitions

Another example operation will now be described by reference to FIGS. 1-3 and 9-12. FIG. 1n particular, this example operation illustrates generation of TypeScript interfaces for an annotated entity specified in a data model definition. The example operation starts by a user of client device 105 accessing data modeling tool 135 of computing system 130 via web browser 110 to create a data model definition. The data model definition defined in this example includes the Employee data entity definition illustrated in FIG. 2 as well as an annotated service entity definition.

FIG. 9 illustrates an example annotated service entity definition 900 according to some embodiments. In particular, annotated service entity definition 900 is the service entity definition defined for this example. As shown, annotated service entity definition 900 is a service block definition for the Employee data entity defined in data model definition 200. Service entity definition 500 includes an exposure of an entity projection on the employee data entity model. Additionally, an unbound action is defined that returns a Boolean value indicating whether the action failed or succeeded. Also, a bound action to the employee entity is defined that takes an employee's ID as a parameter and returns a Boolean value indicating whether the action failed or succeeded.

Upon receiving the data model definition, which includes the Employee data entity definition illustrated in FIG. 2 and annotated service entity definition 900, machine-readable representation generator 140 generates a machine-readable representation of the data model definition. As explained above, FIG. 3 illustrates a machine-readable representation 300 of the Employee data entity definition illustrated in FIG. 2. FIGS. 10A and 10B illustrate a machine-readable representation 1000 of the service entity definition illustrated in FIG. 9 according to some embodiments. In this example, machine-readable representation 1000 is a JSON-based representation of the data model definition. Machine-readable representation generator 140 then sends machine-readable representations 300 and 1000 to TypeScript generator 145.

When TypeScript generator 145 receives machine-readable representations 300 and 1000, TypeScript generator 145 generates, for each service entity annotated with "@AOF.Object", a TypeScript implementation class and a TypeScript Façade interface. The implementation classes are used by application object runtime environment 165 to execute application logic. The TypeScript Façade interfaces, which describe the underlying data entity definitions and service entity definition in TypeScript, are used and extended by the implementation classes. The application logic, implemented by developers (e.g., a developer using development system 115), leverages the generated exit functions of the implementation classes. To enable the application object runtime environment 165 to register entities as application objects, an annotation "@AOF.Object" is used. The implementation path of the application object is derived from the qualified entity name in the data model definition. Alternatively, an entity can be annotated with an annotation "@AOF.Classic". This annotation specifies that the application object definition file for that entity will be used, which does not need an implementation class to be generated.

To generate a TypeScript implementation class, TypeScript generator 145 filters machine-readable representations 300 and 1000 for service entity definitions annotated with the "@AOF.Object" annotation. For each such an annotated service entity definition, TypeScript generator 145 generates a TypeScript class that extends a corresponding Exit interface from the application object's Façade interface. Next, TypeScript generator 145 identifies the composed entities of the annotated service entity definition. For each composed entity, TypeScript generator 145 adds the exit functions to the TypeScript implementation class.

For each implementation class, TypeScript generator 145 also generates a Façade interface. In some embodiments, the Façade interface extend a base interface defined in for application object runtime environment 165. The base interface may provide standard operations for applications objects (e.g., CRUD operations and other convenience functions). The Façade interfaces are implemented in the implementation class or referenced in Exit function implementations by developers (e.g., a developer using development system 115) to access other application objects. To generate Façade interfaces, TypeScript generator 145 filters machine-readable representations 300 and 1000 service entity definitions annotated with the "@AOF.Object" annotation. For each annotated service entity definition, TypeScript generator 145 generates a TypeScript namespace using the name of the service entity as namespace identifier and then generates a TypeScript Façade interface in the namespace.

Then, TypeScript generator 145 populates the Façade interface with TypeScript functions. To provide types for the parameters in the TypeScript function, TypeScript generator 145 extracts the parameters from the action and generates a parameter type interface that includes the action parameters, which are mapped to TypeScript data types, as members of the parameter type interface. TypeScript generator 145 retrieves the static and instance actions for the service entity definition. Instance actions are bound actions in service runtime environment 160 that are directly associated to an entity as they are declared within it (e.g., action promoteEmployee in FIG. 8). Static actions are unbound actions in service runtime environment 160 that are declared within a service but only associated to an entity by the @AOF.Context annotation (e.g., action hireEmployee in FIG. 8). The @AOF.Context annotation uses a value that defines the unbound action that associates an unbound action as static action to an application object Façade interface. For each action specified in the service entity definition, TypeScript generator 145 generates a TypeScript function using the name of the action.

Next, TypeScript generator 145 determines whether the current service entity is annotated with the "@AOF.Classic" annotation. If so, TypeScript 1 generator 145 proceeds to process the next annotated service entity definition. Otherwise, TypeScript generator 145 generates an Exit interface in the namespace for the service entity. To generate Exit functions in the Exit interface, TypeScript generator 145 identifies compositions of the current service entity definition. For each composition, TypeScript generator 145 generates Exit functions and adds them to the Exit interface.

TypeScript generator 145 uses machine-readable representations 300 and 1000 and annotation definitions of annotations defined for application object runtime environment 165 (see Appendix A) as the basis for the process of generating Exit functions. Each annotation definition with of nature of "exit" is processed and the annotation type is used to map the annotations of the data model definitions to the metadata context. The metadata types can be distinguished as follows:

Root: If the entity is a root node entity (object header) and the annotation is of type Root, the annotation is applied to the processed entity Node: Annotation is applied in context of every entity, acting as a node (root or sub-node) in the annotated object.

Attribute: Annotation is applied in context of an entity element acting as node attribute Action: Annotation is applied in context of an (root) entity action Static Action: Annotation is applied in context of an unbound/static action on object level For each annotation, TypeScript generator 145 triggers a generic process of the annotation with respect to the established context above. There may be two cases where an annotation is implicitly derived from the definition name (if not specified explicitly):

Action: An (bound) action without an @AOF.Execute annotation will implicitly get an annotation, where the @AOF.Execute annotation value corresponds to the action name Static Action: An unbound/static action without an @AOF.Execute annotation will implicitly get an annotation, where the @AOF.Execute annotation value corresponds to the static action name TypeScript generator 145 collects Exit annotations for each context and processes them by first retrieving the annotation value. Then TypeScript generator 145 checks cardinality against the annotation configuration. If violated, TypeScript generator 145 terminates the generation process. Otherwise, TypeScript generator 145 determines whether the annotation value is one or multiple valid JavaScript function name(s). If so, TypeScript generator 145 prepares and collects an Exit function configuration and adds it to the Exit interface as described above. In some embodiments, TypeScript generator 145 derives the exit function configuration from the annotation configuration (e.g. signature, parameter types, return type, return value, etc.) merged with additional calculated attributes derived from the current metadata context. TypeScript generator 145 generates Exit functions in the Exit interface or Exit class implementation based on prepared Typescript code templates having a corresponding name, parameter types, return type/value and TypeScript Function Typing declaration. The annotation exits are applied in various contexts in application object runtime environment 165, not only in context of action execution, but also in contexts such as determinations, calculations, validations, checks, etc., FIG. 11 illustrates TypeScript interfaces generated for the service entity definition illustrated in FIG. 9 according to some embodiments. For this example, TypeScript generator 145 uses the technique described to generate TypeScript namespace 1100 and the TypeScript interfaces for the service entity definition based on machine-readable representation 1000. As shown, the name of the service entity in service entity definition 900 is used as the namespace identifier of TypeScript namespace 1100. In addition, TypeScript namespace 1100 includes a Façade interface, which includes functions for the hireEmployee action and the promoteEmployee action specified in service entity definition 900. Also, TypeScript namespace 1100 includes Exit interfaces for the hireEmployee action and the promoteEmployee action specified in service entity definition 900. FIG. 12 illustrates TypeScript implementation classes 1200 generated for the service entity definition illustrated in FIG. 9 according to some embodiments. As illustrated, implementation classes 1200 includes a TypeScript class that generated that extends its corresponding Exit interfaces from the Façade interfaces shown in FIG. 11.

Figure 13:
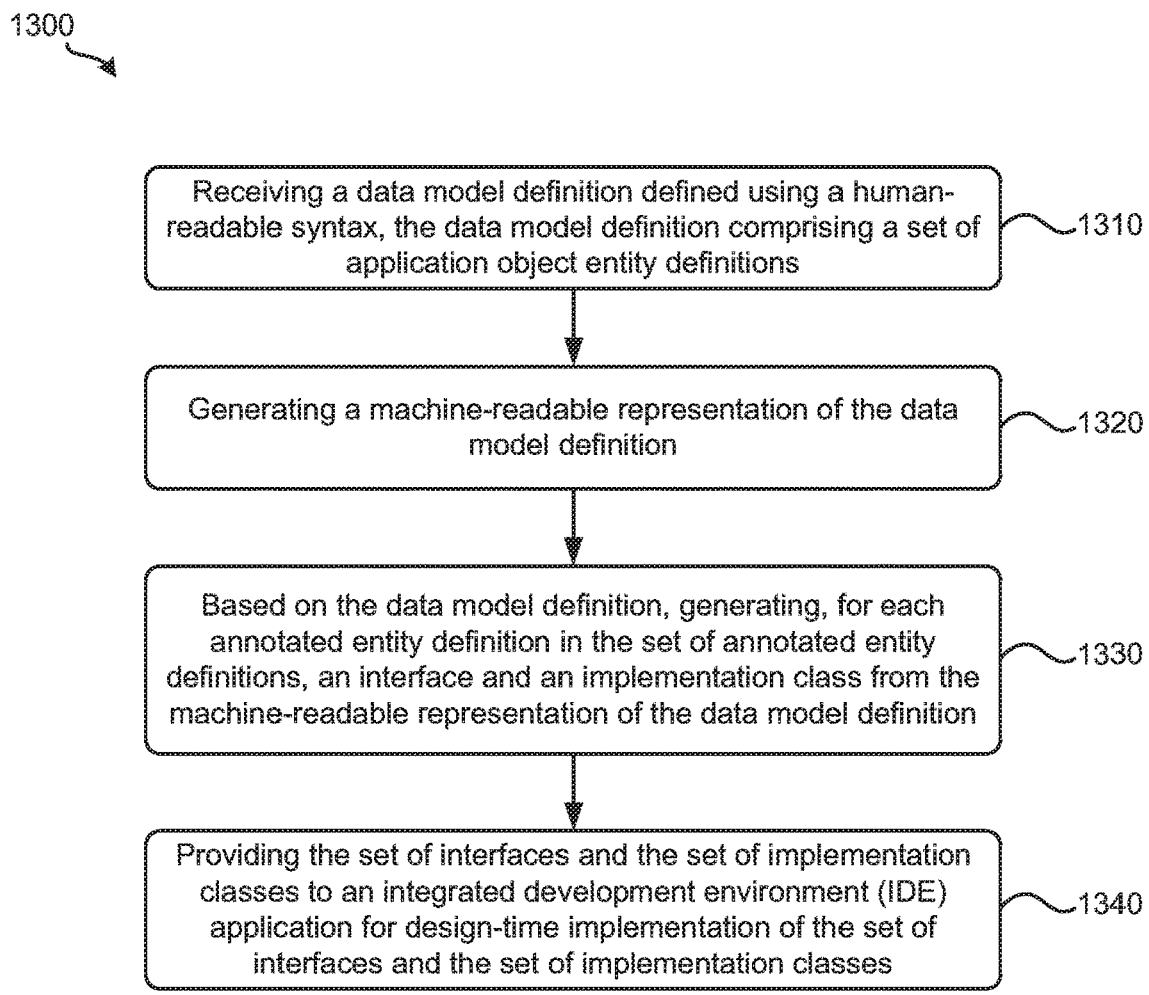
FIG. 13 illustrates a process for generating interfaces for annotated service entity definitions according to some embodiments.

FIG. 13 illustrates a process 1300 for generating interfaces for annotated service entity definitions according to some embodiments.

In some embodiments, computing system 130 performs process 1300. Process 1300 begins by receiving, at 1310, a data model definition defined using a human-readable syntax. The data model definition includes a set of annotated entity definitions. Referring to FIGS. 1, 2 and 9 as an example, computing system 130 may receive from a user of client device 105 a data model definition (e.g., a data model definition that includes the data entity definition in shown in FIG. 2 and service entity definition 900) created with data modeling tool 135.

Next, process 1300 generates, at 1320, a machine-readable representation of the data model definition. Referring to FIGS. 1, 9, 10A, and 10B as an example, machine-readable representation generator 140 can generate the machine-readable representation (e.g., machine-readable representation 1000) of the data model definition (e.g., a data model definition that includes the data entity definition in shown in FIG. 2 and service entity definition 900) when machine-readable representation generator 140 receives the data model definition from data modeling tool 135.

Based on the data model definition, process 1300 then generates, at 1330, for each annotated entity definition in the set of annotated entity definitions, an interface and an implementation class from the machine-readable representation of the data model definition. Referring to FIGS. 1, 11, and 12 as an example, TypeScript generator 145 may generate, for each annotated entity definition in the set of annotated entity definitions (e.g., the entity in FIG. 9 annotated with "@AOF.Object"), the interface (e.g., the TypeScript Façade interface shown in FIG. 11) and implementation class (e.g., implementation classes 1200) from the machine-readable representation (e.g., machine-readable representation 1000) of the data model definition (e.g., a data model definition that includes the data entity definition in shown in FIG. 2 and service entity definition 900).

Finally, process 1300 provides, at 1340, provides the set of interfaces and the set of implementation classes to an integrated development environment (IDE) application for design-time implementation of the set of interfaces and the set of implementation classes. Referring to FIG. 1 as an example, computing system 130 can provide the set of interfaces (e.g., the TypeScript Façade interface shown in FIG. 11) and the set of implementation classes (e.g., implementation classes 1200) to development system 115 so that a developer using development system 115 may implement the set of interfaces and the set of implementation classes during design-time.

Runtime Execution of Entities and Services in Application Object Runtime Environment In some embodiments, application object runtime environment 165 defines a set of annotations that influence the behavior of an application object during runtime. Examples of such annotations are shown in Appendix A. The annotations can be distinguished by its nature attribute: Annotations defined with a nature attribute of "Exit" describe an application object runtime exit that is be implemented within an application object and called during runtime processing in application object runtime environment 165. Annotations defined with a nature attribute of "Definition" describes an application object metadata definition of an application object. Annotations defined with a nature attribute of "Module" defines specifies for an application object module (e.g., which service runtime environment 160 entity is interpreted as an application object (e.g., the @AOF.Object annotation). Annotations defined with a nature attribute of "Context" provides additional context information in application object runtime environment 165 by fill missing information in service runtime environment 160 definitions (e.g., the @AOF.Context annotation).

Annotations can also be distinguished by its metadata context type. If the entity is a root node entity (object header) and the annotation is of type Root, the annotation is applied to the processed entity. Annotations that have a metadata context type of "Node" are applied in context of every entity acting as a node (root or subnode) in the annotated object. Annotations that have a metadata context type of "Attribute" are applied in context of an entity element acting as a node attribute. Annotations that have a metadata context type of "Action" are applied in context of an (root) entity action. Annotations that have a metadata context type of "Static Action" are applied in context of an unbound/static action on object level.

In some embodiments, application object specific data entity annotations can be used during runtime by registering application objects, enriching metadata, and processing runtime calls. In some such embodiments, these operations are performed by annotations processor 170. The application object runtime environment 165 needs to be registered into the service runtime environment 160. Therefore, a generic application object service implementation (e.g., handlers) registers to all events for application object enabled entities and actions. These include entities annotated with the "@AOF.Object," sub-entities reachable via composition association from an entity annotated with "@AOF.Object," instance/bound actions of an entity annotated with "@AOF.Object," and static/unbound actions of a service entity annotated with "@AOF.Context".

The handler registration described above can also trigger the application object registration in application object runtime environment 165. Each object annotated with the "@AOF.Object" annotation is registered with its service entity name in the application object runtime environment 165. These registered objects are used for the metadata enrichment step described below. If an application object was previously registered, it will not be registered again.

Each registered application object can be addressed by its name derived from the service entity name annotated with the "@AOF.Object" annotation. As the object definition was registered empty, metadata enrichment is used to enhance the object definition with service runtime environment 160 specific metadata that is derived from the machine-readable representations of data model definitions.

The metadata enrichment process starts with the reading the machine-readable representation of the data model definition. Next, the annotation metadata enrichment step, the application object specific annotation definitions are read (e.g., the annotation definitions shown in Appendix A). As described above, the registration process has already been executed. Part of the registration process is the registration of a metadata enrichment callback in a metadata module for the service runtime environment 160.

Every time an application object is instantiated, the object metadata is constructed (and buffered afterwards), with the help of the registered metadata enrichment callback. Within the registered metadata enrichment callback, information in the machine-readable representation of the data model definition is processed and the object metadata definition is enriched for the application object runtime environment 165.

The hierarchical information in the machine-readable representation of a data model definition is transformed to an application object metadata definition configuration as follows. First, the object definition header is initialized, which includes default actions (e.g., CRUD, Copy, Navigate and Query actions) Authorization checks are disabled by default, as the authorization concept is delegated for external usage to the service runtime environment 160.

Next, for each instance/bound or static/unbound action in the root entity annotated with the "@AOF.Object" annotation, the action is initialized with authorization checks disabled and empty execution functions (these be overridden annotation metadata enrichment process). The actions are checked for core actions, which are to be protected. If the entity is based on another source entity, this process is executed recursively on the source entity, and so on and so forth. For each action, the annotation metadata enrichment process is called. Propagation values are propagated from the higher context (e.g., header) to the action context The entity annotated with the "@AOF.Object" annotation acts as the application object root node. Thus, the root node is initialized with defaulting values. The root source entity (i.e., the data entity) to the annotated entity is determined. The root node table definition is set as root source entity name (i.e., being the data entity representation). Also, information in the machine-readable representation of the data model definition like "read only", "system admin data", "e-tag", are mapped accordingly. For each element definition with a primitive type in the root source entity, an attribute metadata definition is added and initialized. The further processing is described below in the discussion related to attributes. For each element definition with an association/composite type in the root source entity, an association is added and initialized in the metadata definition. The further processing is described below in the discussion related to associations. If the entity is based on another source entity this process is executed recursively on the source entity, and so on and so forth. The annotation metadata enrichment process is called with the context Root Node. Propagation values are propagated from the higher context (header) to the root node context For sub-nodes, the same process described above that is used to process a root node is utilized. In addition, the parent key is calculated from the composition hierarchy information in the machine-readable representation of the data model definition. Furthermore, the node cardinality is derived from the this composition information The sub-nodes are processed recursively via the node composition association as sub-nodes themselves. This results in a composition tree of nodes and sub-nodes in the object metadata definition. If the entity is based on another source entity this process is executed recursively on the source entity, and so on and so forth. For each node the annotation metadata enrichment process is called with the context Sub-Node. Propagation values are propagated from the higher context (parent node) to the node context For attributes, the following information is derived from the element metadata in the machine-readable representation of the data model definition for the attribute definition: "type", "primary key", "read only", "required", "max length", "enum", and "concurrency control". If the entity is based on another source entity this process is executed recursively on the source entity, and so on and so forth. For each attribute the annotation metadata enrichment process is called with the context Attribute. Propagation values are propagated from the higher context (current node) to the attribute context.

For associations, each association on each node level is initialized, which includes the target, the association key, and the information, if the association is an inter-object or intra-object association (e.g., the "@AOF.IntraObject" annotation). If the entity is based on another source entity this process is executed recursively on the source entity, and so on and so forth. For each association element the annotation metadata enrichment process is called with the context association element. Propagation values are propagated from the higher context (current node) to the attribute context.

The processes described above illustrate how to derive the object metadata from the core metadata information. Application object specific annotations have not been handled up to this point. That is, only the core metadata information was taken over into the object metadata definition. Application object specific annotations bring an additional level of metadata information not expressible via core annotations. Therefore an annotation metadata enrichment process is needed. Application object specific annotations bring an additional information source for enriching the object metadata definition to fully function as an application object in application object runtime environment 165

The annotation metadata enrichment process starts by identifying annotations with a nature attribute of "exit" or "definition" in order to enhance the object definition. For annotations with a nature of "exit", executable JavaScript logic is added into the application object implementations exits. Examples of such logic include action executes, determinations, validations, etc. The exit annotation values are represented by a string value, representing a function name in the object implementation class and are located in the file system using the fully qualified name consisting of the namespace and the local name, which are canonically mapped to directory and file names (e.g. a dot '.' separator is replaced by a path '/' separator). The JavaScript function referenced by this pointer, is directly hooked into the object metadata definition to be called during runtime in the application object runtime environment 165.

For annotations with a nature attribute of "definition", additional application object specific metadata information is added to the following levels: root, node, attribute, action and static action The following canonical mapping between service runtime environment 160 metadata and application object runtime environment 165 metadata is shown in the following Table 2:

TABLE 2

| Data Definition Metadata | Application Object Metadata |
| --- | --- |
| Entity with Annotation @AOF.Object | Definition Header and Root Node |
| Sub-Entity of Entity with @AOF.Object | Sub-Node |
| Bound Action on Entity with @AOF.Object | Header Instance Action |

TABLE 2-continued

| Data Definition Metadata | Application Object Metadata |
| --- | --- |
| Unbound Action with @AOF.Context | Header Static Action |
| Entity Element with Simple Type | Node Attribute |
| Entity Element with Association Type | Node Association |
| Entity Element with Composition Type | Parent Keys in Sub-Node |

The process of mapping the application object specific annotations to the object metadata definition starts by enriching the metadata for the annotation of the data model definition. Next, an annotation value is retrieved from the context metadata object. In some embodiments, if this value is complex (e.g. a JSON object), post-processing may be performed to compile the runtime annotation value. If the retrieved value is not set, processing ends for this annotation and the next annotation is processed. If the multiplicity of the annotation value according to the annotation definition is violated, an exception is thrown, and the runtime execution stops. If the nature of the annotation is "other", the processing ends for this annotation and the next annotation is processed. If the nature attribute is "exit", the annotation value (i.e., the function name) in the registered exit implementation class singleton is looked up. The exit function call is wrapped as an anonymous function and the current string value is replaced by a function value. If the nature attribute is "exit" or "definition", the annotation value is further processed. The value is checked against the annotation type an determine whether it is a valid annotation value.

According to the metadata definition in the annotation configuration, the context is prepared relative to the current execution context. The annotation definition is split into definition parts along a dot character (i.e., '.'). If a spread operator (i.e., '*') is used, the context is multiplied/spread along the next definition part to an array context. If the definition starts with a slash (i.e., '/'), the context starts at the absolute metadata object header context. Otherwise a relative context is used for further processing. For each definition part, the annotation value is set on the identified corresponding object metadata definition part (e.g. Root, Node, Action, Attribute or substructure). If multiple values are allowed, an array value is initialized if the target definition is not yet initialized. The annotation value is pushed into the array value. If multiple values are not allowed, the annotation value is set or, if provided, the default value of the annotation is used. As the context could be an array through the definition parts and spread operator, the value can be set multiple times on metadata definition parts along the relative contexts.

Definition path mappings are described as follows. An annotation is the name of the application object specific annotations starting with "@AOF". A type is an associated JavaScript type in runtime representation. A multiple is an annotation value that can be specified as an array, allowing multiple specifications. For exits, a kind is a kind of exit (e.g. a determination, a check, etc.), a parameter type is a parameter structure and type of exit, a return type is a return type of an exit, and a shortcut is a noted JavaScript value of the specified type(s) (instead of a function name) A mapping is a mapping from advanced annotations to classic application object definitions. For example, a period (i.e., ".") indicates a definition element traversal, a slash (i.e., "/") indicates the definition root as context when starting with the slash (otherwise a relative context is applied), and an asterisk (i.e., "*") indicates a spread operator (mapping is applied to all entries in the collection (e.g., objects, arrays)). A propagation indicates a definition is propagated to the specified definition type (e.g., a node). A description is a textual description of an annotation.

Once all annotations have been processed and the annotation values have been enriched (using the annotation metadata enrichment process on the corresponding object metadata definition of application object runtime environment 165, the object metadata is ready and complete for application object runtime environment 165.

During a runtime call, the service runtime environment 160 handlers are called for registered application objects. As the application object was registered before and the metadata enrichment is in place, during the instantiation of the application object the metadata is enriched by the service runtime environment 160 metadata and the application object specific annotations metadata definitions, thereby producing a fully valid application object in place on which the runtime call is processed. CRUD operations are delegated to the corresponding application object core services. The metadata mapping described above ensures the runtime consistency between service runtime environment 160 and application object runtime environment 165. Bound actions are delegated to the corresponding application object instance action. The metadata mapping described above ensures the runtime consistency between service runtime environment 160 and application object runtime environment 165. Unbound actions are called on the application object identified by the value of the @AOF.Context annotation during runtime. The unbound action is represented as a static action in the context-identified application object. The metadata mapping described above ensures the runtime consistency between service runtime environment 160 and application object runtime environment 165.

Figure 14:
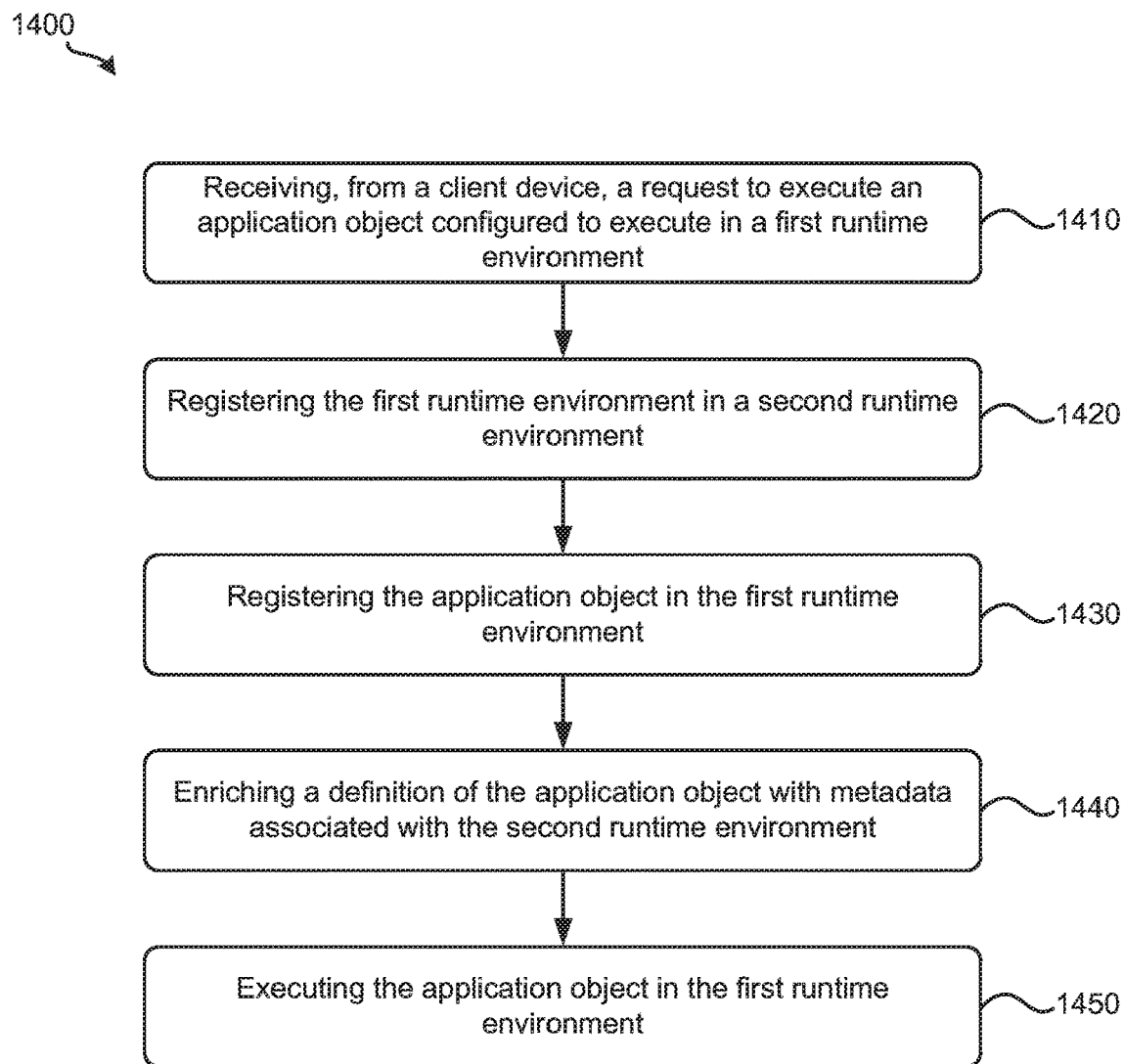
FIG. 14 illustrates a process for executing entities and services in an application object runtime environment according to some embodiments.

FIG. 14 illustrates a process 1400 for executing entities and services in an application object runtime environment according to some embodiments. In some embodiments, computing system 130 performs process 1400. Process 1400 starts by receiving, at 1410, from a client device, a request to execute an application object configured to execute in a first runtime environment. Referring to FIG. 1 as an example, computing system 130 may receive from client device 105, the request to execute an application object configured to execute in application object runtime environment 165.

Next, process 1400 registers, at 1420, the first runtime environment in a second runtime environment. Referring to FIG. 1 as an example, annotations processor 170 may register application object runtime environment 165 in service runtime environment 160. Process 1400 then registers, at 1430, the application object in the first runtime environment. Referring to FIG. 1 as an example, annotations processor 170 can register the application object in application object runtime environment 165.

At 1440, process 1400 enriches a definition of the application object with metadata associated with the second runtime environment. Referring to FIG. 1 as an example, annotations processor 170 may enrich a definition of the application object with metadata associated with service runtime environment 160. Finally, process 1400 executes, at 1450, the application object in the first runtime environment. Referring to FIG. 1 as an example, application object runtime environment 165 may execute the application object in application object runtime environment 165.

Figure 15:
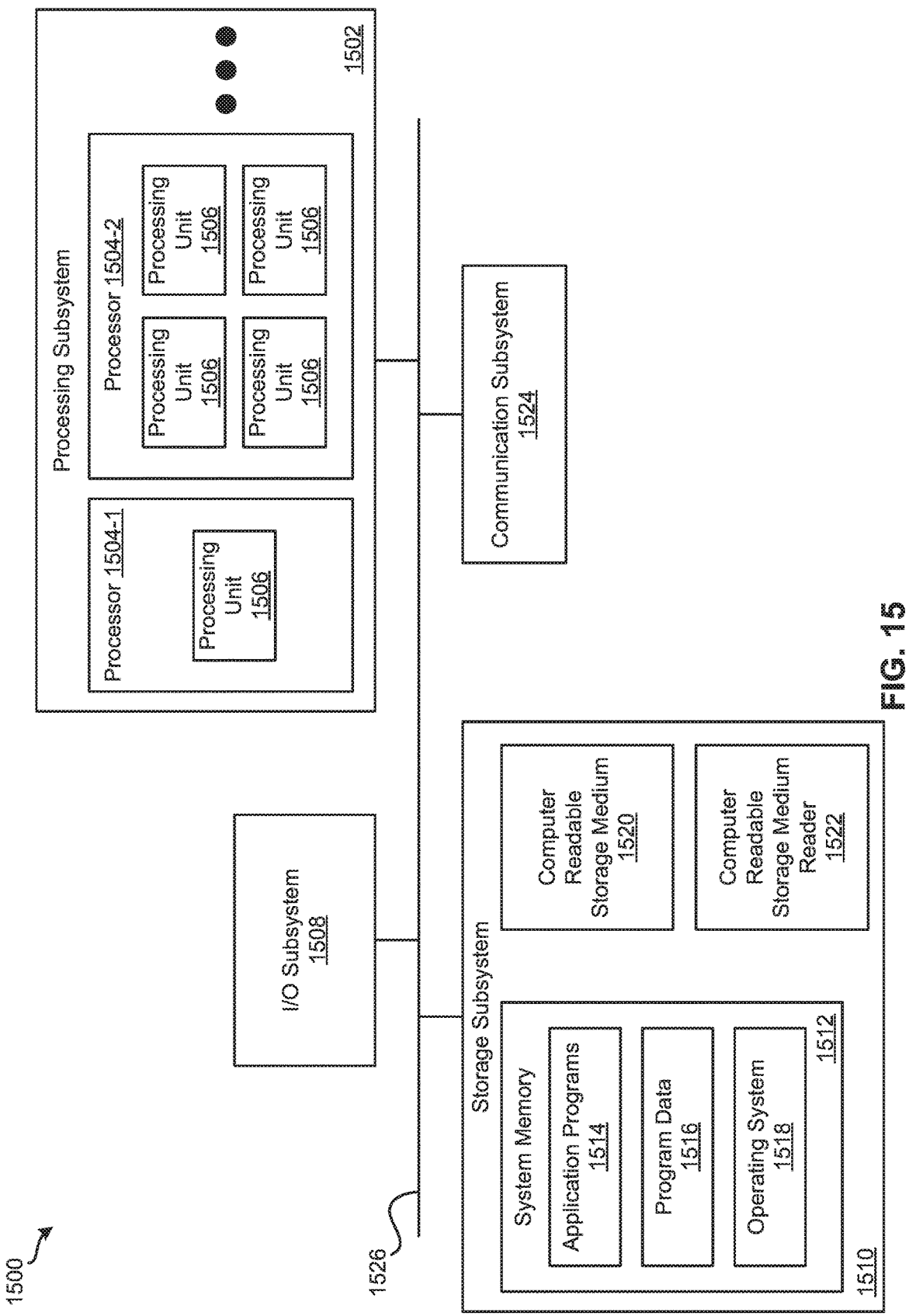
FIG. 15 illustrates an exemplary computer system, in which various embodiments may be implemented.

FIG. 15 illustrates an exemplary computer system 1500 for implementing various embodiments described above. For example, computer system 1500 may be used to implement client device 105, development system 115, and computing system 130. Computer system 1500 may be a desktop computer, a laptop, a server computer, or any other type of computer system or combination thereof. Some or all elements of web browser 110, DE 120, TypeScript compiler 125, data modeling tool 135, machine-readable representation generator 140, TypeScript generator 145, JS runtime environment 150, or combinations thereof can be included or implemented in computer system 1500. In addition, computer system 1500 can implement many of the operations, methods, and/or processes described above (e.g., process 800, process 1300, and process 1400). As shown in FIG. 15, computer system 1500 includes processing subsystem 1502, which communicates, via bus subsystem 1526, with input/output (I/O) subsystem 1508, storage subsystem 1510 and communication subsystem 1524.

Bus subsystem 1526 is configured to facilitate communication among the various components and subsystems of computer system 1500. While bus subsystem 1526 is illustrated in FIG. 15 as a single bus, one of ordinary skill in the art will understand that bus subsystem 1526 may be implemented as multiple buses. Bus subsystem 1526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1502, which can be implemented as one or more integrated circuits (e.g., a conventional microprocessor or microcontroller), controls the operation of computer system 1500. Processing subsystem 1502 may include one or more processors 1504. Each processor 1504 may include one processing unit 1506 (e.g., a single core processor such as processor 1504-1) or several processing units 1506 (e.g., a multicore processor such as processor 1504-2). In some embodiments, processors 1504 of processing subsystem 1502 may be implemented as independent processors while, in other embodiments, processors 1504 of processing subsystem 1502 may be implemented as multiple processors integrate into a single chip or multiple chips. Still, in some embodiments, processors 1504 of processing subsystem 1502 may be implemented as a combination of independent processors and multiple processors integrated into a single chip or multiple chips.

In some embodiments, processing subsystem 1502 can execute a variety of programs or processes in response to program code and can maintain multiple concurrently executing programs or processes. At any given time, some or all of the program code to be executed can reside in processing subsystem 1502 and/or in storage subsystem 1510. Through suitable programming, processing subsystem 1502 can provide various functionalities, such as the functionalities described above by reference to process 800, process 1300, process 1400, etc.

I/O subsystem 1508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1500 to a user or another device (e.g., a printer).

As illustrated in FIG. 15, storage subsystem 1510 includes system memory 1512, computer-readable storage medium 1520, and computer-readable storage medium reader 1522. System memory 1512 may be configured to store software in the form of program instructions that are loadable and executable by processing subsystem 1502 as well as data generated during the execution of program instructions. In some embodiments, system memory 1512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1512 may include different types of memory, such as static random access memory (SRAM) and/or dynamic random access memory (DRAM). System memory 1512 may include a basic input/output system (BIOS), in some embodiments, that is configured to store basic routines to facilitate transferring information between elements within computer system 1500 (e.g., during start-up). Such a BIOS may be stored in ROM (e.g., a ROM chip), flash memory, or any other type of memory that may be configured to store the BIOS.

As shown in FIG. 15, system memory 1512 includes application programs 1514, program data 1516, and operating system (OS) 1518. OS 1518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1520 may be a non-transitory computer-readable medium configured to store software (e.g., programs, code modules, data constructs, instructions, etc.). Many of the components (e.g., web browser 110, DE 120, TypeScript compiler 125, data modeling tool 135, machine-readable representation generator 140, TypeScript generator 145, and JS runtime environment 150) and/or processes (e.g., process 800, process 1300, and process 1400) described above may be implemented as software that when executed by a processor or processing unit (e.g., a processor or processing unit of processing subsystem 1502) performs the operations of such components and/or processes. Storage subsystem 1510 may also store data used for, or generated during, the execution of the software.

Storage subsystem 1510 may also include computer-readable storage medium reader 1522 that is configured to communicate with computer-readable storage medium 1520. Together and, optionally, in combination with system memory 1512, computer-readable storage medium 1520 may comprehensively represent remote, local, fixed, and/or removable storage devices plus storage media for temporarily and/or more permanently containing, storing, transmitting, and retrieving computer-readable information.

Computer-readable storage medium 1520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1524 serves as an interface for receiving data from, and transmitting data to, other devices, computer systems, and networks. For example, communication subsystem 1524 may allow computer system 1500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1524 may provide components configured for wired communication (e.g., Ethernet) in addition to or instead of components configured for wireless communication.

One of ordinary skill in the art will realize that the architecture shown in FIG. 15 is only an example architecture of computer system 1500, and that computer system 1500 may have additional or fewer components than shown, or a different configuration of components. The various components shown in FIG. 15 may be implemented in hardware, software, firmware or any combination thereof, including one or more signal processing and/or application specific integrated circuits.

Figure 16:
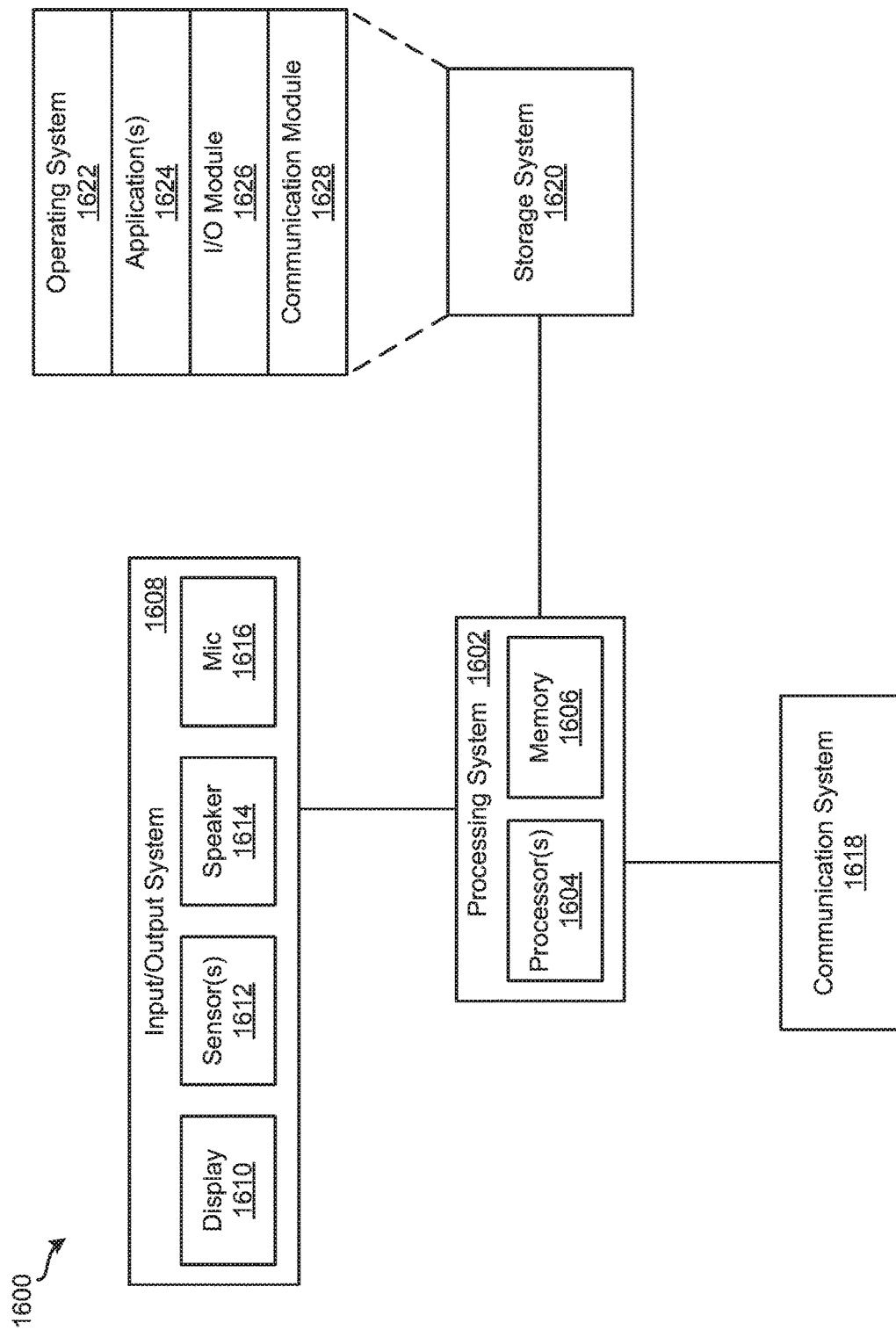
FIG. 16 illustrates an exemplary computing device, in which various embodiments may be implemented.

FIG. 16 illustrates an exemplary computing device 1600 for implementing various embodiments described above. For example, computing device 1600 may be used to implement client device 105. Computing device 1600 may be a cellphone, a smartphone, a wearable device, an activity tracker or manager, a tablet, a personal digital assistant (PDA), a media player, or any other type of mobile computing device or combination thereof. As shown in FIG. 16, computing device 1600 includes processing system 1602, input/output (I/O) system 1608, communication system 1618, and storage system 1620. These components may be coupled by one or more communication buses or signal lines.

Processing system 1602, which can be implemented as one or more integrated circuits (e.g., a conventional microprocessor or microcontroller), controls the operation of computing device 1600. As shown, processing system 1602 includes one or more processors 1604 and memory 1606. Processors 1604 are configured to run or execute various software and/or sets of instructions stored in memory 1606 to perform various functions for computing device 1600 and to process data.

Each processor of processors 1604 may include one processing unit (e.g., a single core processor) or several processing units (e.g., a multicore processor). In some embodiments, processors 1604 of processing system 1602 may be implemented as independent processors while, in other embodiments, processors 1604 of processing system 1602 may be implemented as multiple processors integrate into a single chip. Still, in some embodiments, processors 1604 of processing system 1602 may be implemented as a combination of independent processors and multiple processors integrated into a single chip.

Memory 1606 may be configured to receive and store software (e.g., operating system 1622, applications 1624, I/O module 1626, communication module 1628, etc. from storage system 1620) in the form of program instructions that are loadable and executable by processors 1604 as well as data generated during the execution of program instructions. In some embodiments, memory 1606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1608 is responsible for receiving input through various components and providing output through various components. As shown for this example, I/O system 1608 includes display 1610, one or more sensors 1612, speaker 1614, and microphone 1616. Display 1610 is configured to output visual information (e.g., a graphical user interface (GUI) generated and/or rendered by processors 1604). In some embodiments, display 1610 is a touch screen that is configured to also receive touch-based input. Display 1610 may be implemented using liquid crystal display (LCD) technology, light-emitting diode (LED) technology, organic LED (OLED) technology, organic electro luminescence (OEL) technology, or any other type of display technologies. Sensors 1612 may include any number of different types of sensors for measuring a physical quantity (e.g., temperature, force, pressure, acceleration, orientation, light, radiation, etc.). Speaker 1614 is configured to output audio information and microphone 1616 is configured to receive audio input. One of ordinary skill in the art will appreciate that I/O system 1608 may include any number of additional, fewer, and/or different components. For instance, I/O system 1608 may include a keypad or keyboard for receiving input, a port for transmitting data, receiving data and/or power, and/or communicating with another device or component, an image capture component for capturing photos and/or videos, etc.

Communication system 1618 serves as an interface for receiving data from, and transmitting data to, other devices, computer systems, and networks. For example, communication system 1618 may allow computing device 1600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1618 may provide components configured for wired communication (e.g., Ethernet) in addition to or instead of components configured for wireless communication.

Storage system 1620 handles the storage and management of data for computing device 1600. Storage system 1620 may be implemented by one or more non-transitory machine-readable mediums that are configured to store software (e.g., programs, code modules, data constructs, instructions, etc.) and store data used for, or generated during, the execution of the software.

In this example, storage system 1620 includes operating system 1622, one or more applications 1624, I/O module 1626, and communication module 1628. Operating system 1622 includes various procedures, sets of instructions, software components and/or drivers for controlling and managing general system tasks (e.g., memory management, storage device control, power management, etc.) and facilitates communication between various hardware and software components. Operating system 1622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1624 can include any number of different applications installed on computing device 1600. Examples of such applications may include a browser application (e.g., web browser 110), an address book application, a contact list application, an email application, an instant messaging application, a word processing application, JAVA-enabled applications, an encryption application, a digital rights management application, a voice recognition application, location determination application, a mapping application, a music player application, etc.

I/O module 1626 manages information received via input components (e.g., display 1610, sensors 1612, and microphone 1616) and information to be outputted via output components (e.g., display 1610 and speaker 1614). Communication module 1628 facilitates communication with other devices via communication system 1618 and includes various software components for handling data received from communication system 1618.

One of ordinary skill in the art will realize that the architecture shown in FIG. 16 is only an example architecture of computing device 1600, and that computing device 1600 may have additional or fewer components than shown, or a different configuration of components. The various components shown in FIG. 16 may be implemented in hardware, software, firmware or any combination thereof, including one or more signal processing and/or application specific integrated circuits.

Figure 17:
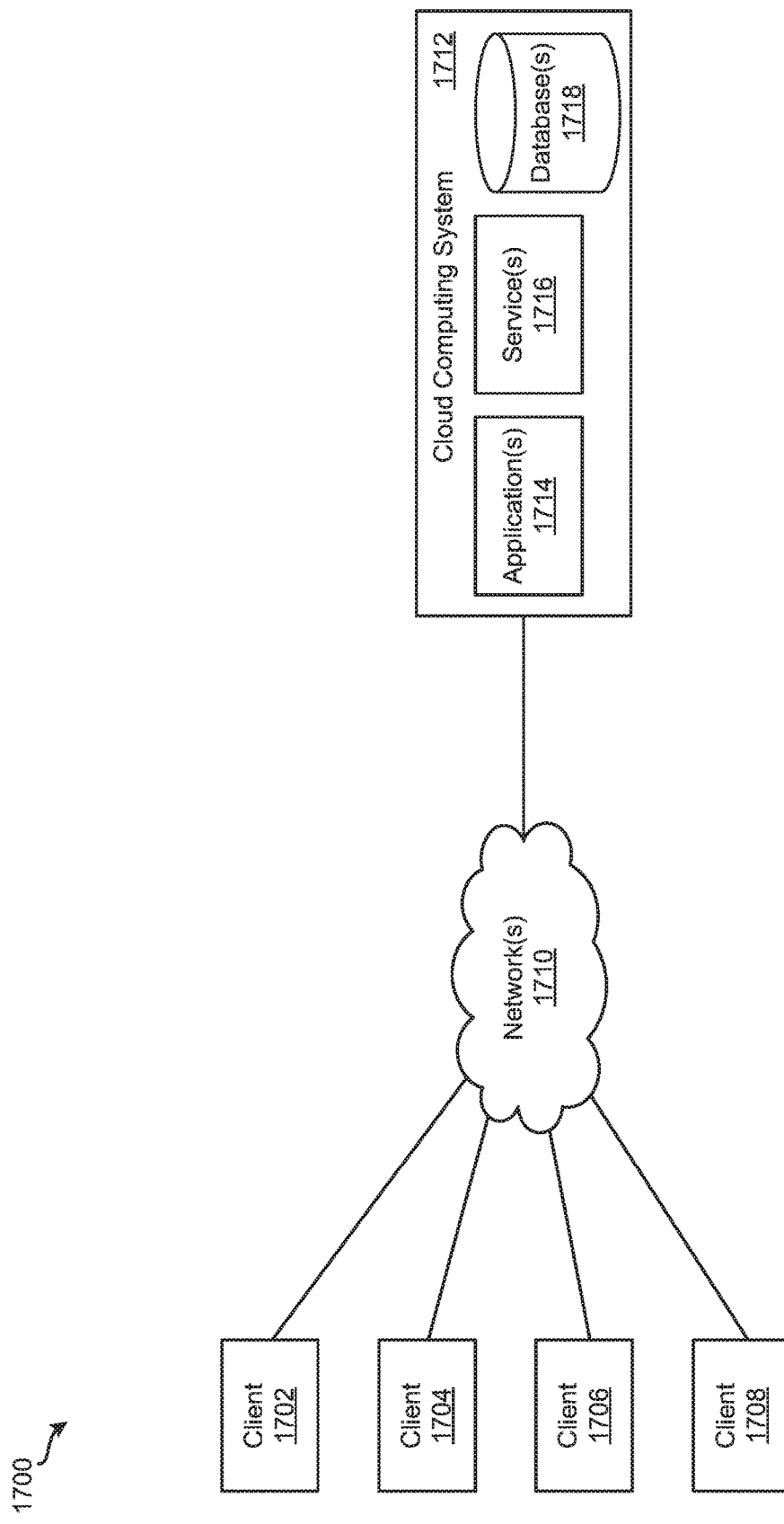
FIG. 17 illustrates an exemplary system, in which various embodiments may be implemented.

FIG. 17 illustrates an exemplary system 1700 for implementing various embodiments described above. For example, one of client devices 1702-1708 of system 1700 may be used to implement client device 105, one of client devices 1702-1708 of system 1700 may be used to implement development system 115, and cloud computing system 1712 of system 1700 may be used to implement computing system 130. As shown, system 1700 includes client devices 1702-1708, one or more networks 1710, and cloud computing system 1712. Cloud computing system 1712 is configured to provide resources and data to client devices 1702-1708 via networks 1710. In some embodiments, cloud computing system 1700 provides resources to any number of different users (e.g., customers, tenants, organizations, etc.). Cloud computing system 1712 may be implemented by one or more computer systems (e.g., servers), virtual machines operating on a computer system, or a combination thereof.

As shown, cloud computing system 1712 includes one or more applications 1714, one or more services 1716, and one or more databases 1718. Cloud computing system 1700 may provide applications 1714, services 1716, and databases 1718 to any number of different customers in a self-service, subscription-based, elastically scalable, reliable, highly available, and secure manner.

In some embodiments, cloud computing system 1700 may be adapted to automatically provision, manage, and track a customer's subscriptions to services offered by cloud computing system 1700. Cloud computing system 1700 may provide cloud services via different deployment models. For example, cloud services may be provided under a public cloud model in which cloud computing system 1700 is owned by an organization selling cloud services and the cloud services are made available to the general public or different industry enterprises. As another example, cloud services may be provided under a private cloud model in which cloud computing system 1700 is operated solely for a single organization and may provide cloud services for one or more entities within the organization. The cloud services may also be provided under a community cloud model in which cloud computing system 1700 and the cloud services provided by cloud computing system 1700 are shared by several organizations in a related community. The cloud services may also be provided under a hybrid cloud model, which is a combination of two or more of the aforementioned different models.

In some instances, any one of applications 1714, services 1716, and databases 1718 made available to client devices 1702-1708 via networks 1710 from cloud computing system 1700 is referred to as a "cloud service." Typically, servers and systems that make up cloud computing system 1700 are different from the on-premises servers and systems of a customer. For example, cloud computing system 1700 may host an application and a user of one of client devices 1702-1708 may order and use the application via networks 1710.

Applications 1714 may include software applications that are configured to execute on cloud computing system 1712 (e.g., a computer system or a virtual machine operating on a computer system) and be accessed, controlled, managed, etc. via client devices 1702-1708. In some embodiments, applications 1714 may include server applications and/or mid-tier applications (e.g., HTTP (hypertext transport protocol) server applications, FTP (file transfer protocol) server applications, CGI (common gateway interface) server applications, JAVA server applications, etc.). Services 1716 are software components, modules, application, etc. that are configured to execute on cloud computing system 1712 and provide functionalities to client devices 1702-1708 via networks 1710. Services 1716 may be web-based services or on-demand cloud services.

Databases 1718 are configured to store and/or manage data that is accessed by applications 1714, services 1716, and/or client devices 1702-1708. For instance, storages 175, storage 180, and database 185 may be stored in databases 1718. Databases 1718 may reside on a non-transitory storage medium local to (and/or resident in) cloud computing system 1712, in a storage-area network (SAN), on a non-transitory storage medium local located remotely from cloud computing system 1712. In some embodiments, databases 1718 may include relational databases that are managed by a relational database management system (RDBMS). Databases 1718 may be a column-oriented databases, row-oriented databases, or a combination thereof. In some embodiments, some or all of databases 1718 are in-memory databases. That is, in some such embodiments, data for databases 1718 are stored and managed in memory (e.g., random access memory (RAM)).

Client devices 1702-1708 are configured to execute and operate a client application (e.g., a web browser, a proprietary client application, etc.) that communicates with applications 1714, services 1716, and/or databases 1718 via networks 1710. This way, client devices 1702-1708 may access the various functionalities provided by applications 1714, services 1716, and databases 1718 while applications 1714, services 1716, and databases 1718 are operating (e.g., hosted) on cloud computing system 1700. Client devices 1702-1708 may be computer system 1500 or computing device 1600, as described above by reference to FIGS. 15 and 16, respectively. Although system 1700 is shown with four client devices, any number of client devices may be supported.

Networks 1710 may be any type of network configured to facilitate data communications among client devices 1702-1708 and cloud computing system 1712 using any of a variety of network protocols. Networks 1710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

APPENDIX A

```
{
  "@AOF.OnCreate": {
    "Root": {
      "nature": "exit",
      "kind": "CreateDetermination",
      "type": "function",
      "signature": "key, data, persistedData, message, nextHandle, context, metadata",
      "parameters": "key, data: <data>, persistedData: persisted<Data>, message, context, metadata",
      "returnType": "Promise<void>",
      "definition": "determinations.onCreate",
      "multiple": true,
      "description": "Specifies determinations executed at application object creation"
    }
  },
  "@AOF.OnUpdate": {
    "Root": {
      "nature": "exit",
      "kind": "UpdateDetermination",
      "type": "function",
      "signature": "key, data, persistedData, message, nextHandle, context, metadata",
      "parameters": "key, data: <data>, persistedData: persisted<Data>, message, context, metadata",
      "returnType": "Promise<void>",
      "definition": "determinations.onUpdate",
      "multiple": true,
      "description": "Specifies determinations executed at application object updates, custom actions"
    }
  },
  "@AOF.OnModify": {
    "Root": {
      "nature": "exit",
      "kind": "ModifyDetermination",
      "type": "function",
      "signature": "key, data, persistedData, message, nextHandle, context, metadata",
      "parameters": "key, data: <data>, persistedData: persisted<Data>, message, context, metadata",
      "returnType": "Promise<void>",
      "definition": "determinations.onModify",
      "multiple": true,
      "description": "Specifies determinations executed at application object creation, copy, update, customAction"
    }
```

```
    },
    "@AOF.OnDelete": {
      "Root": {
        "nature": "exit",
        "kind": "DeleteDetermination",
        "type": "function",
        "signature": "key, data, persistedData, message, nextHandle, context, metadata",
        "parameters": "key, data: <data>, persistedData: persisted<Data>, message, context, metadata",
        "returnType": "Promise<void>",
        "definition": "determinations.onDelete",
        "multiple": true,
        "description": "Specifies determinations executed at application object deletion"
      }
    },
    "@AOF.OnCopy": {
      "Root": {
        "nature": "exit",
        "kind": "CopyDetermination",
        "type": "function",
        "signature": "key, data, persistedData, message, nextHandle, context, metadata",
        "parameters": "key, data: <data>, persistedData: persisted<Data>, message, context, metadata",
        "returnType": "Promise<void>",
        "definition": "determinations.onCopy",
        "multiple": true,
        "description": "Specifies determinations executed at application object copy"
      }
    },
    "@AOF.OnPrepareCopy": {
      "Root": {
        "nature": "exit",
        "kind": "PrepareCopyDetermination",
        "type": "function",
        "signature": "key, data, persistedData, message, nextHandle, context, metadata",
        "parameters": "key, data: <data>, persistedData: persisted<Data>, message, context, metadata",
        "returnType": "Promise<void>",
        "definition": "determinations.onPrepareCopy",
        "multiple": true,
        "description": "Specifies determinations executed before application object copy"
      }
    },
    "@AOF.OnPersist": {
```

```
    "Root": {
      "nature": "exit",
      "kind": "PersistDetermination",
      "type": "function",
      "signature": "key, data, persistedData, message, nextHandle, context, metadata, info",
      "parameters": "key, data: <data>, persistedData: persisted<Data>, message, context, metadata, info",
      "returnType": "Promise<void>",
      "definition": "determinations.onPersist",
      "multiple": true,
      "description": "Specifies determinations executed afterÂ changes have been persisted in the database"
    }
  },
  "@AOF.OnCommit": {
    "Root": {
      "nature": "exit",
      "kind": "CommitDetermination",
      "type": "function",
      "signature": "key, data, persistedData, message, nextHandle, context, metadata",
      "parameters": "key, data: <data>, persistedData: persisted<Data>, message, context, metadata",
      "returnType": "Promise<void>",
      "definition": "determinations.onCommit",
      "multiple": true,
      "description": "Specifies determinations executed before transaction commit on the database"
    }
  },
  "@AOF.OnRollback": {
    "Root": {
      "nature": "exit",
      "kind": "RollbackDetermination",
      "type": "function",
      "signature": "key, data, persistedData, message, nextHandle, context, metadata",
      "parameters": "key, data: <data>, persistedData: persisted<Data>, message, context, metadata",
      "returnType": "Promise<void>",
      "definition": "determinations.onRollback",
      "multiple": true,
      "description": "Specifies determinations executed before transaction rollback on the database"
    }
  },
  "@AOF.OnRead": {
    "Root": {
      "nature": "exit",
```

```
      "kind": "ReadDetermination",
      "type": "function",
      "signature": "key, data, context, metadata",
      "parameters": "key, data: <data>, context, metadata",
      "returnType": "Promise<void>",
      "definition": "determinations.onRead",
      "multiple": true,
      "description": "Specifies determinations executed at application object creation read"
    }
  },
  "@AOF.ReadOnly": {
    "Node": {
      "nature": "exit",
      "kind": "NodeReadOnlyCheck",
      "type": "function|boolean",
      "signature": "key, persistedData, message, context, metadata",
      "parameters": "key, persistedData: persisted<Data>, message, context, metadata",
      "returnType": "Promise<boolean>",
      "returnValue": "return false;",
      "definition": "readOnly",
      "shortcut": "boolean",
      "multiple": false,
      "description": "Specifies if the node (incl. attributes is modifiable from outside)"
    },
    "Attribute": {
      "nature": "exit",
      "kind": "AttributeReadOnlyCheck",
      "type": "function|boolean",
      "signature": "key, persistedData, message, context, metadata",
      "parameters": "key, persistedData: persisted<Data>, message, context, metadata",
      "returnType": "Promise<boolean>",
      "returnValue": "return false;",
      "definition": "readOnly",
      "shortcut": "boolean",
      "multiple": false,
      "description": "Specifies that the attribute is read only and not modifiable from outside"
    },
    "Action": {
      "nature": "exit",
      "kind": "ActionReadOnlyCheck",
      "type": "function|boolean",
      "signature": "key, persistedData, message, context, metadata",
```

```
      "parameters": "key, persistedData: persisted<Data>,
message, context, metadata",
      "returnType": "Promise<boolean>",
      "returnValue": "return false;",
      "definition": "readOnly",
      "shortcut": "boolean",
      "multiple": false,
      "description": "Specifies if the custom action execution
can have side effects. Read Only actions are exposed via HTTP
GET."
    }
  },
  "@AOF.ConsistencyCheck": {
    "Root": {
      "nature": "exit",
      "kind": "RootNodeConsistencyCheck",
      "type": "function",
      "signature": "key, data, persistedData, message,
context, metadata",
      "parameters": "key, data: <data>, persistedData:
persisted<Data>, message, context, metadata",
      "returnType": "Promise<void>",
      "definition": "consistencyChecks",
      "multiple": true,
      "description": "Specifies consistency checks on node
after modifications"
    },
    "Node": {
      "nature": "exit",
      "kind": "SubNodeConsistencyCheck",
      "type": "function",
      "signature": "key, data, persistedData, message,
context, metadata",
      "parameters": "key, data: <data>, persistedData:
persisted<Data>, message, context, metadata",
      "returnType": "Promise<void>",
      "definition": "consistencyChecks",
      "multiple": true,
      "description": "Specifies consistency checks on node
after modifications"
    },
    "Attribute": {
      "nature": "exit",
      "kind": "AttributeConsistencyCheck",
      "type": "function",
      "signature": "key, attribute, message, context,
metadata",
      "parameters": "key, attribute, message, context,
metadata",
      "returnType": "Promise<void>",
```

```
      "definition": "consistencyChecks",
      "multiple": true,
      "description": "Specifies consistency checks on attribute after modifications"
    }
  },
  "@AOF.InputCheck": {
    "Root": {
      "nature": "exit",
      "kind": "RootNodeInputCheck",
      "type": "function",
      "signature": "key, data, persistedData, message, context, metadata",
      "parameters": "key, data: <data>, persistedData: persisted<Data>, message, context, metadata",
      "returnType": "Promise<void>",
      "definition": "inputChecks",
      "multiple": true,
      "description": "Specifies input checks on node before modifications"
    },
    "Node": {
      "nature": "exit",
      "kind": "SubNodeInputCheck",
      "type": "function",
      "signature": "key, data, persistedData, message, context, metadata",
      "parameters": "key, data: <data>, persistedData: persisted<Data>, message, context, metadata",
      "returnType": "Promise<void>",
      "definition": "inputChecks",
      "multiple": true,
      "description": "Specifies input checks on node before modifications"
    },
    "Attribute": {
      "nature": "exit",
      "kind": "AttributeInputCheck",
      "type": "function",
      "signature": "key, attribute, message, context, metadata",
      "parameters": "key, attribute, message, context, metadata",
      "returnType": "Promise<void>",
      "definition": "inputChecks",
      "multiple": true,
      "description": "Specifies input checks on attribute before modifications"
    }
  },
```

```
  "@AOF.ExecutionCheck.Create": {
    "Root": {
      "nature": "exit",
      "kind": "CreateExecutionCheck",
      "type": "function",
      "signature": "key, inputData, data, persistedData, message, context, metadata",
      "parameters": "key, inputData: input<Data>, data: <data>, persistedData: persisted<Data>, message, context, metadata",
      "returnType": "Promise<void>",
      "definition": "/actions.create.executionCheck",
      "multiple": false,
      "description": "Specifies the execution check for the action for create, update, delete action"
    }
  },
  "@AOF.ExecutionCheck.Update": {
    "Root": {
      "nature": "exit",
      "kind": "UpdateExecutionCheck",
      "type": "function",
      "signature": "key, inputData, data, persistedData, message, context, metadata",
      "parameters": "key, inputData: input<Data>, data: <data>, persistedData: persisted<Data>, message, context, metadata",
      "returnType": "Promise<void>",
      "definition": "/actions.update.executionCheck",
      "multiple": false,
      "description": "Specifies the execution check for the action for create, update, delete action"
    }
  },
  "@AOF.ExecutionCheck.Delete": {
    "Root": {
      "nature": "exit",
      "kind": "DeleteExecutionCheck",
      "type": "function",
      "signature": "key, inputData, data, persistedData, message, context, metadata",
      "parameters": "key, inputData: input<Data>, data: <data>, persistedData: persisted<Data>, message, context, metadata",
      "returnType": "Promise<void>",
      "definition": "/actions.delete.executionCheck",
      "multiple": false,
      "description": "Specifies the execution check for the action for create, update, delete action"
    }
```

```
    },
    "@AOF.ExecutionCheck.Copy": {
      "Root": {
        "nature": "exit",
        "kind": "CopyExecutionCheck",
        "type": "function",
        "signature": "key, inputData, data, persistedData, message, context, metadata",
        "parameters": "key, inputData: input<Data>, data: <data>, persistedData: persisted<Data>, message, context, metadata",
        "returnType": "Promise<void>",
        "definition": "/actions.copy.executionCheck",
        "multiple": false,
        "description": "Specifies the execution check for the action for create, update, delete action"
      }
    },
    "@AOF.AuthorizationCheck": {
      "Action": {
        "nature": "exit",
        "kind": "ActionAuthorizationCheck",
        "type": "function",
        "signature": "key, persistedData, message, context, metadata",
        "parameters": "key, persistedData: persisted<Data>, message, context, metadata",
        "returnType": "Promise<void>",
        "definition": "authorizationCheck",
        "multiple": false,
        "description": "Specifies the authorization check for the action"
      },
      "StaticAction": {
        "nature": "exit",
        "kind": "StaticActionAuthorizationCheck",
        "type": "function",
        "signature": "parameters, message, context, metadata",
        "parameters": "parameters, message, context, metadata",
        "parameterType": "P",
        "returnType": "Promise<void>",
        "definition": "authorizationCheck",
        "multiple": false,
        "description": "Specifies the authorization check for the action"
      }
    },
    "@AOF.AuthorizationCheck.Create": {
      "Root": {
        "nature": "exit",
```

```
      "kind": "ActionAuthorizationCheck",
      "type": "function",
      "signature": "key, persistedData, message, context, metadata",
      "parameters": "key, persistedData: persisted<Data>, message, context, metadata",
      "returnType": "Promise<void>",
      "definition": "/actions.create.authorizationCheck",
      "multiple": false,
      "description": "Specifies the authorization check for the 'create' action"
    }
  },
  "@AOF.AuthorizationCheck.Update": {
    "Root": {
      "nature": "exit",
      "kind": "ActionAuthorizationCheck",
      "type": "function",
      "signature": "key, persistedData, message, context, metadata",
      "parameters": "key, persistedData: persisted<Data>, message, context, metadata",
      "returnType": "Promise<void>",
      "definition": "/actions.update.authorizationCheck",
      "multiple": false,
      "description": "Specifies the authorization check for the 'update' action"
    }
  },
  "@AOF.AuthorizationCheck.Delete": {
    "Root": {
      "nature": "exit",
      "kind": "ActionAuthorizationCheck",
      "type": "function",
      "signature": "key, persistedData, message, context, metadata",
      "parameters": "key, persistedData: persisted<Data>, message, context, metadata",
      "returnType": "Promise<void>",
      "definition": "/actions.delete.authorizationCheck",
      "multiple": false,
      "description": "Specifies the authorization check for the 'delete' action"
    }
  },
  "@AOF.AuthorizationCheck.Copy": {
    "Root": {
      "nature": "exit",
      "kind": "ActionAuthorizationCheck",
      "type": "function",
```

```
      "signature": "key, persistedData, message, context, metadata",
      "parameters": "key, persistedData: persisted<Data>, message, context, metadata",
      "returnType": "Promise<void>",
      "definition": "/actions.copy.authorizationCheck",
      "multiple": false,
      "description": "Specifies the authorization check for the 'copy' action"
    }
  },
  "@AOF.AuthorizationCheck.ConvertKey": {
    "Root": {
      "nature": "exit",
      "kind": "ActionAuthorizationCheck",
      "type": "function",
      "signature": "key, persistedData, message, context, metadata",
      "parameters": "key, persistedData: persisted<Data>, message, context, metadata",
      "returnType": "Promise<void>",
      "definition": "/actions.convertKey.authorizationCheck",
      "multiple": false,
      "description": "Specifies the authorization check for the 'convertKey' action"
    }
  },
  "@AOF.AuthorizationCheck.Read": {
    "Root": {
      "nature": "exit",
      "kind": "ActionAuthorizationCheck",
      "type": "function",
      "signature": "key, persistedData, message, context, metadata",
      "parameters": "key, persistedData: persisted<Data>, message, context, metadata",
      "returnType": "Promise<void>",
      "definition": "/actions.read.authorizationCheck",
      "multiple": false,
      "description": "Specifies the authorization check for the 'read' action"
    }
  },
  "@AOF.AuthorizationCheck.Query": {
    "Root": {
      "nature": "exit",
      "kind": "StaticActionAuthorizationCheck",
      "type": "function",
      "signature": "parameters, message, context, metadata",
      "parameters": "parameters, message, context, metadata",
```

```
      "parameterType": "P",
      "returnType": "Promise<void>",
      "definition": "/actions.query.authorizationCheck",
      "multiple": false,
      "description": "Specifies the authorization check for the 'query' action"
    }
  },
  "@AOF.AuthorizationCheck.Navigate": {
    "Root": {
      "nature": "exit",
      "kind": "ActionAuthorizationCheck",
      "type": "function",
      "signature": "key, persistedData, message, context, metadata",
      "parameters": "key, persistedData: persisted<Data>, message, context, metadata",
      "returnType": "Promise<void>",
      "definition": "/actions.navigate.authorizationCheck",
      "multiple": false,
      "description": "Specifies the authorization check for the 'navigate' action"
    }
  },
  "@AOF.EnabledCheck": {
    "Action": {
      "nature": "exit",
      "kind": "ActionEnabledCheck",
      "type": "function",
      "signature": "key, persistedData, message, context, metadata",
      "parameters": "key, persistedData: persisted<Data>, message, context, metadata",
      "returnType": "Promise<void>",
      "definition": "enabledCheck",
      "multiple": false,
      "description": "Specifies the enabled check for the action"
    },
    "StaticAction": {
      "nature": "exit",
      "kind": "StaticActionEnabledCheck",
      "type": "function",
      "signature": "parameters, readOnlyBulkAccess, message, context, metadata",
      "parameters": "parameters, message, context, metadata",
      "parameterType": "P",
      "returnType": "Promise<void>",
      "definition": "enabledCheck",
      "multiple": false,
```

```
        "description": "Specifies the enabled check for the action"
      }
    },
    "@AOF.EnabledCheck.Create": {
      "Root": {
        "nature": "exit",
        "kind": "ActionEnabledCheck",
        "type": "function",
        "signature": "key, persistedData, message, context, metadata",
        "parameters": "key, persistedData: persisted<Data>, message, context, metadata",
        "returnType": "Promise<void>",
        "definition": "/actions.create.enabledCheck",
        "multiple": false,
        "description": "Specifies the enabled check for the 'create' action"
      }
    },
    "@AOF.EnabledCheck.Update": {
      "Root": {
        "nature": "exit",
        "kind": "ActionEnabledCheck",
        "type": "function",
        "signature": "key, persistedData, message, context, metadata",
        "parameters": "key, persistedData: persisted<Data>, message, context, metadata",
        "returnType": "Promise<void>",
        "definition": "/actions.update.enabledCheck",
        "multiple": false,
        "description": "Specifies the enabled check for the 'update' action"
      }
    },
    "@AOF.EnabledCheck.Delete": {
      "Root": {
        "nature": "exit",
        "kind": "ActionEnabledCheck",
        "type": "function",
        "signature": "key, persistedData, message, context, metadata",
        "parameters": "key, persistedData: persisted<Data>, message, context, metadata",
        "returnType": "Promise<void>",
        "definition": "/actions.delete.enabledCheck",
        "multiple": false,
        "description": "Specifies the enabled check for the 'delete' action"
```

```
      }
    },
    "@AOF.EnabledCheck.Copy": {
      "Root": {
        "nature": "exit",
        "kind": "ActionEnabledCheck",
        "type": "function",
        "signature": "key, persistedData, message, context, metadata",
        "parameters": "key, persistedData: persisted<Data>, message, context, metadata",
        "returnType": "Promise<void>",
        "definition": "/actions.copy.enabledCheck",
        "multiple": false,
        "description": "Specifies the enabled check for the 'copy' action"
      }
    },
    "@AOF.Execute": {
      "Action": {
        "nature": "exit",
        "kind": "ActionExecute",
        "type": "function",
        "signature": "key, parameters, data, message, nextHandle, context, metadata",
        "parameters": "key, parameters, data: <data>, message, context, metadata",
        "parameterType": "P",
        "returnType": "Promise<?>",
        "returnValue": "return;",
        "definition": "execute",
        "multiple": false,
        "description": "Specifies the execution logic of the custom action including checks"
      },
      "StaticAction": {
        "nature": "exit",
        "kind": "StaticActionExecute",
        "type": "function",
        "signature": "parameters, bulkAccess, message, nextHandle, context, metadata",
        "parameters": "parameters, message, context, metadata",
        "parameterType": "P",
        "returnType": "Promise<?>",
        "returnValue": "return;",
        "definition": "execute",
        "multiple": false,
        "description": "Specifies the execution logic of the custom action including checks"
      }
```

```
      },
      "@AOF.Persist": {
        "Root": {
          "nature": "exit",
          "kind": "ActionPersist",
          "type": "function",
          "signature": "key, data, dbAction, message, context, metadata",
          "parameters": "key, data: <data>, dbAction, message, context, metadata",
          "returnType": "Promise<void>",
          "returnValue": "return dbAction.default();",
          "definition": "/actions.*.persist",
          "multiple": false,
          "description": "Optional function to redefine persist behavior"
        }
      },
      "@AOF.CustomProperties": {
        "Node": {
          "nature": "exit",
          "kind": "NodeCustomProperties",
          "type": "function|object|string",
          "signature": "key, persistedData, message, context, metadata",
          "parameters": "key, persistedData: persisted<Data>, message, context, metadata",
          "returnType": "Promise<object>",
          "returnValue": "return {};",
          "definition": "customProperties",
          "shortcut": "object",
          "shortcutOptional": true,
          "multiple": false,
          "description": "Specifies static custom properties or a function which determines custom properties, custom properties are not part of runtime processing but interesting for clients"
        },
        "Attribute": {
          "nature": "exit",
          "kind": "AttributeCustomProperties",
          "type": "function|object|string",
          "signature": "key, persistedData, message, context, metadata",
          "parameters": "key, persistedData: persisted<Data>, message, context, metadata",
          "returnType": "Promise<object>",
          "returnValue": "return {};",
          "definition": "customProperties",
          "shortcut": "object",
```

```
      "shortcutOptional": true,
      "multiple": false,
      "description": "Specifies static custom properties or a
function which determines custom properties, custom properties
are not part of runtime processing but interesting for
clients"
    },
    "Action": {
      "nature": "exit",
      "kind": "ActionCustomProperties",
      "type": "function|object|string",
      "signature": "key, parameters, persistedData, message,
context, metadata",
      "parameters": "key, parameters, persistedData:
persisted<Data>, message, context, metadata",
      "parameterType": "P",
      "returnType": "Promise<object>",
      "returnValue": "return {};",
      "definition": "customProperties",
      "shortcut": "object",
      "shortcutOptional": true,
      "multiple": false,
      "description": "Specifies static custom properties or a
function which determines custom properties, custom properties
are not part of runtime processing but interesting for
clients"
    },
    "StaticAction": {
      "nature": "exit",
      "kind": "StaticActionCustomProperties",
      "type": "function|object|string",
      "signature": "parameters, readOnlyBulkAccess, message,
context, metadata",
      "parameters": "parameters, message, context, metadata",
      "parameterType": "P",
      "returnType": "Promise<object>",
      "returnValue": "return {};",
      "definition": "customProperties",
      "shortcut": "object",
      "shortcutOptional": true,
      "multiple": false,
      "description": "Specifies static custom properties or a
function which determines custom properties, custom properties
are not part of runtime processing but interesting for
clients"
    }
  },
  "@AOF.CustomProperties.Create": {
    "Root": {
      "nature": "exit",
```

```
      "kind": "NodeCustomProperties",
      "type": "function|object|string",
      "signature": "key, persistedData, message, context, metadata",
      "parameters": "key, persistedData: persisted<Data>, message, context, metadata",
      "returnType": "Promise<object>",
      "returnValue": "return {};",
      "definition": "/actions.create.customProperties",
      "shortcut": "object",
      "shortcutOptional": true,
      "multiple": false,
      "description": "Specifies static custom properties or a function which determines custom properties, custom properties are not part of runtime processing but interesting for clients"
    }
  },
  "@AOF.CustomProperties.Update": {
    "Root": {
      "nature": "exit",
      "kind": "NodeCustomProperties",
      "type": "function|object|string",
      "signature": "key, persistedData, message, context, metadata",
      "parameters": "key, persistedData: persisted<Data>, message, context, metadata",
      "returnType": "Promise<object>",
      "returnValue": "return {};",
      "definition": "/actions.update.customProperties",
      "shortcut": "object",
      "shortcutOptional": true,
      "multiple": false,
      "description": "Specifies static custom properties or a function which determines custom properties, custom properties are not part of runtime processing but interesting for clients"
    }
  },
  "@AOF.CustomProperties.Delete": {
    "Root": {
      "nature": "exit",
      "kind": "NodeCustomProperties",
      "type": "function|object|string",
      "signature": "key, persistedData, message, context, metadata",
      "parameters": "key, persistedData: persisted<Data>, message, context, metadata",
      "returnType": "Promise<object>",
      "returnValue": "return {};",
```

```
      "definition": "/actions.delete.customProperties",
      "shortcut": "object",
      "shortcutOptional": true,
      "multiple": false,
      "description": "Specifies static custom properties or a
function which determines custom properties, custom properties
are not part of runtime processing but interesting for
clients"
    }
  },
  "@AOF.CustomProperties.Copy": {
    "Root": {
      "nature": "exit",
      "kind": "NodeCustomProperties",
      "type": "function|object|string",
      "signature": "key, persistedData, message, context,
metadata",
      "parameters": "key, persistedData: persisted<Data>,
message, context, metadata",
      "returnType": "Promise<object>",
      "returnValue": "return {};",
      "definition": "/actions.copy.customProperties",
      "shortcut": "object",
      "shortcutOptional": true,
      "multiple": false,
      "description": "Specifies static custom properties or a
function which determines custom properties, custom properties
are not part of runtime processing but interesting for
clients"
    }
  },
  "@AOF.Object": {
    "Root": {
      "nature": "module",
      "type": "string|boolean",
      "shortcut": "self",
      "multiple": false,
      "description": "Marks an Application Object.
Implementation path is derived from qualified entity name."
    }
  },
  "@AOF.View": {
    "Node": {
      "nature": "definition",
      "definition": "view",
      "type": "string|boolean",
      "shortcut": "self",
      "multiple": false,
      "description": "Specifies the read view (must join the
persistence table and select all attributes of the application
``` object node). If value is omitted the current entity is taken as view, in case it's no persistence entity. Only valid in SQL schema scope context"
      }
    },
    "@AOF.HistoryTable": {
      "Node": {
        "nature": "definition",
        "type": "string",
        "definition": "historyTable",
        "multiple": false,
        "description": "Specifies the persistence history table for the application object node. Only valid in SQL schema scope context"
      }
    },
    "@AOF.ExternalKey": {
      "Node": {
        "nature": "definition",
        "type": "boolean",
        "definition": "externalKey",
        "multiple": false,
        "description": "Specifies if the key of the node is specified externally or internally (default is derived automatically from primary key data type and additional node metadata)"
      }
    },
    "@AOF.CascadeDelete": {
      "Root": {
        "nature": "definition",
        "type": "string",
        "definition": "/cascadeDelete",
        "multiple": true,
        "description": "Allows to define other application object to which deletion of this object should be cascaded. Contains a list of Application Object names"
      }
    },
    "@AOF.AlternativeKey": {
      "Attribute": {
        "nature": "definition",
        "type": "boolean",
        "definition": "isAlternativeKey",
        "multiple": false,
        "description": "Attribute is part of the alternative key"
      }
    },
    "@AOF.ConstantKey": {

```
    "Attribute": {
      "nature": "definition",
      "type": "string|boolean|number",
      "definition": "constantKey",
      "multiple": false,
      "description": "Specifies a constant key the attribute is default with and which is used during read for selection"
    }
  },
  "@AOF.DataType": {
    "Attribute": {
      "nature": "definition",
      "type": "string",
      "definition": "dataType",
      "multiple": false,
      "description": "Specifies the data type of the attribute"
    }
  },
  "@AOF.MinValue": {
    "Attribute": {
      "nature": "definition",
      "type": "number",
      "definition": "minValue",
      "multiple": false,
      "description": "Specifies that the minÂ value of the attribute value if it has type Number (Integer or Double)"
    }
  },
  "@AOF.MaxValue": {
    "Attribute": {
      "nature": "definition",
      "type": "number",
      "definition": "maxValue",
      "multiple": false,
      "description": "Specifies that the maxÂ value of the attribute value if it has type Number (Integer or Double)"
    }
  },
  "@AOF.MaxLength": {
    "Attribute": {
      "nature": "definition",
      "type": "number",
      "definition": "maxLength",
      "multiple": false,
      "description": "Specifies that the maxÂ length of the attribute value if it has type String"
    }
  },
  "@AOF.JSONSchema": {
```

```
    "Attribute": {
      "nature": "definition",
      "type": "object|string",
      "definition": "jsonSchema",
      "shortcut": "object",
      "multiple": false,
      "description": "Specifies a json schema which will be used for validation. Note: ensure to use the respective json data type."
    }
  },
  "@AOF.DefaultValue": {
    "Attribute": {
      "nature": "definition",
      "type": "string|boolean|number|object",
      "definition": "defaultValue",
      "shortcut": "object",
      "shortcutOptional": true,
      "multiple": false,
      "description": "Default value of the attribute, when node is created"
    }
  },
  "@AOF.IsConstant": {
    "Attribute": {
      "nature": "definition",
      "type": "boolean",
      "definition": "isConstant",
      "multiple": false,
      "description": "Attribute is constant (not changeable after node creation)"
    }
  },
  "@AOF.Transient": {
    "Root": {
      "nature": "definition",
      "type": "boolean",
      "definition": "table",
      "value": null,
      "multiple": false,
      "propagation": "Node",
      "description": "Specifies that the object is transient"
    },
    "Node": {
      "nature": "definition",
      "type": "boolean",
      "definition": "table",
      "value": null,
      "multiple": false,
      "description": "Specifies that the node is transient"
```

```
    },
    "Attribute": {
      "nature": "definition",
      "type": "boolean",
      "definition": "transient",
      "multiple": false,
      "description": "Specifies that the attribute is transient"
    }
  },
  "@AOF.Label": {
    "Root": {
      "nature": "definition",
      "type": "string",
      "definition": [
        "label",
        "/label"
      ],
      "multiple": false,
      "description": "Specifies the describing label"
    },
    "Node": {
      "nature": "definition",
      "type": "string",
      "definition": "label",
      "multiple": false,
      "description": "Specifies the describing label"
    },
    "Attribute": {
      "nature": "definition",
      "type": "string",
      "definition": "label",
      "multiple": false,
      "description": "Specifies the describing label"
    },
    "Action": {
      "nature": "definition",
      "type": "string",
      "definition": "label",
      "multiple": false,
      "description": "Specifies the describing label"
    },
    "StaticAction": {
      "nature": "definition",
      "type": "string",
      "definition": "label",
      "multiple": false,
      "description": "Specifies the describing label"
    }
  },
```

```
  "@AOF.IsEmail": {
    "Attribute": {
      "nature": "definition",
      "type": "boolean",
      "definition": "isEmail",
      "multiple": false,
      "description": "Specifies that the attribute value represents an e-mail address"
    }
  },
  "@AOF.IsName": {
    "Attribute": {
      "nature": "definition",
      "type": "boolean",
      "definition": "isName",
      "multiple": false,
      "description": "Specifies that the attribute is the (one and only) name attribute usable for human-readable display and fuzzy search purposes of an object (node) instance"
    }
  },
  "@AOF.IsDescription": {
    "Attribute": {
      "nature": "definition",
      "type": "boolean",
      "definition": "isDescription",
      "multiple": false,
      "description": "Specifies that the attribute is a description attribute usable for human-readable fuzzy search purposes of an object (node) instance"
    }
  },
  "@AOF.IntraObject": {
    "Attribute": {
      "nature": "definition",
      "type": "boolean",
      "definition": "intraObject",
      "multiple": false,
      "description": "Specifies that the attribute represents an intra-object association"
    }
  },
  "@AOF.IsInternal": {
    "Action": {
      "nature": "definition",
      "type": "boolean",
      "definition": "isInternal",
      "multiple": false,
      "description": "Specifies if the action can only be called internally"
```

```
    },
    "StaticAction": {
      "nature": "definition",
      "type": "boolean",
      "definition": "isInternal",
      "multiple": false,
      "description": "Specifies if the static action can only be called internally"
    }
  },
  "@AOF.HistoryEvent": {
    "Action": {
      "nature": "definition",
      "type": "string",
      "definition": "historyEvent",
      "multiple": false,
      "description": "Specifies history event name for the history table entry"
    }
  },
  "@AOF.HistoryEvent.Create": {
    "Root": {
      "nature": "definition",
      "type": "string",
      "definition": "/actions.create.historyEvent",
      "multiple": false,
      "description": "Specifies create history event name for the history table entry"
    }
  },
  "@AOF.HistoryEvent.Update": {
    "Root": {
      "nature": "definition",
      "type": "string",
      "definition": "/actions.update.historyEvent",
      "multiple": false,
      "description": "Specifies update history event name for the history table entry"
    }
  },
  "@AOF.HistoryEvent.Delete": {
    "Root": {
      "nature": "definition",
      "type": "string",
      "definition": "/actions.delete.historyEvent",
      "multiple": false,
      "description": "Specifies delete history event name for the history table entry"
    }
  },
```

```
    "@AOF.Info": {
      "Root": {
        "nature": "definition",
        "type": "object",
        "definition": [
          "info",
          "/info"
        ],
        "multiple": false,
        "description": "Specifies additional generic context-specific custom metadata information (e.g. filled by metadata enrichment)"
      },
      "Node": {
        "nature": "definition",
        "type": "object",
        "definition": "info",
        "multiple": false,
        "description": "Specifies additional generic context-specific custom metadata information (e.g. filled by metadata enrichment)"
      },
      "Attribute": {
        "nature": "definition",
        "type": "object",
        "definition": "info",
        "multiple": false,
        "description": "Specifies additional generic context-specific custom metadata information (e.g. filled by metadata enrichment)"
      },
      "Action": {
        "nature": "definition",
        "type": "object",
        "definition": "info",
        "multiple": false,
        "description": "Specifies additional generic context-specific custom metadata information (e.g. filled by metadata enrichment)"
      },
      "StaticAction": {
        "nature": "definition",
        "type": "object",
        "definition": "info",
        "multiple": false,
        "description": "Specifies additional generic context-specific custom metadata information (e.g. filled by metadata enrichment)"
      }
    },
```

```
"@AOF.Context": {
  "StaticAction": {
    "nature": "context",
    "type": "string",
    "multiple": false,
    "description": "Specifies the context to an Application
Object for static actions. Qualified name of an entity
annotated with '@AOF.Object' can be provided."
  }
 }
}
```

What is claimed is:

1. A non-transitory machine-readable medium storing a program executable by at least one processing unit of a device, the program comprising sets of instructions for:
receiving a data model definition defined using a human-readable syntax, the data model definition including data entity definitions and service entity definitions comprising a function associated with a data entity definition, wherein the service entity definitions are defined in the data model definition in the human-readable syntax;
generating a machine-readable representation of the data model definition;
based on the data model definition, generating a set of interfaces from the machine-readable representation of the data model definition, each interface in the set of interfaces comprising code specified in a programming language, the set of interfaces including data entity interfaces and service entity interfaces, wherein said generating the set of interfaces includes, for each data entity definition in the data model definition, determining whether the data entity definition extends another data entity definition and when so determined configuring a generated interface to extend to another interface for the another data entity definition and,
for each action in a service entity definition, generating a corresponding function in the programming language in a corresponding service entity interface; and
providing the set of interfaces to an integrated development environment (IDE) application for design-time implementation of the set of interfaces;
wherein the program further comprises sets of instructions for deploying the data model definition to a database, wherein deploying the data model definition to the database comprises, for each data entity definition in a set of data entity definitions specified in the data model definition, creating a table in the database comprising a set of columns, wherein each column in the set of column is for an attribute in a set of attributes specified in the data entity definition.

2. The non-transitory machine-readable medium of claim 1, wherein the program further comprises sets of instructions for receiving, through the IDE, additional code specified in the programming language comprising a set of operations for an interface in the set of interfaces.

3. The non-transitory machine-readable medium of claim 1, wherein the program further comprises sets of instructions for:
generating a namespace for the service entity definition that includes a façade interface; and
receiving, through the IDE, additional code from the programming language comprising a set of operations for the façade interface.

4. The non-transitory machine-readable medium of claim 1, wherein the programing language is a first programming language, wherein the program further comprises sets of instructions for transcompiling the code from the first programming language to a second programming language.

5. The non-transitory machine-readable medium of claim 4, wherein the first programming language is a strongly-typed programming language and wherein the second programming language is a weakly-typed programming language.

6. The non-transitory machine-readable medium of claim 4, wherein the transcompiled code is configured for server-side execution on a computing device.

7. The non-transitory machine-readable medium of claim 1, wherein each data entity definition in the set of data entity definitions specifies a set of attributes and a set of data types associated with the set of attributes.

8. A method, executable by a device, comprising:
receiving a data model definition defined using a human-readable syntax, the data model definition including data entity definitions and service entity definitions comprising a function associated with a data entity definition, wherein the service entity definitions are defined in the data model definition in the human-readable syntax;
generating a machine-readable representation of the data model definition;
based on the data model definition, generating a set of interfaces from the machine-readable representation of the data model definition, each interface in the set of interfaces comprising code specified in a programming language, the set of interfaces including data entity interfaces and service entity interfaces, wherein said generating the set of interfaces includes, for each data entity definition in the data model definition, determining whether the data entity definition extends another data entity definition and when so determined configuring a generated interface to extend to another interface for the another data entity definition and,
for each action in a service entity definition, generating a corresponding function in the programming language in a corresponding service entity interface; and
providing the set of interfaces to an integrated development environment (IDE) application for design-time implementation of the set of interfaces;
wherein the method further comprises deploying the data model definition to a database, wherein deploying the data model definition to the database comprises, for each data entity definition in a set of data entity definitions specified in the data model definition, creating a table in the database comprising a set of columns, wherein each column in the set of column is for an attribute in the set of attributes specified in the data entity definition.

9. The method of claim 8 further comprising receiving, through the IDE, additional code specified in the programming language comprising a set of operations for an interface in the set of interfaces.

10. The method of claim 8, wherein the method further comprises:
generating a namespace for the service entity definition that includes a façade interface; and
receiving, through the IDE, additional code from the programming language comprising a set of operations for the façade interface.

11. The method of claim 8, wherein the programing language is a first programming language, wherein the program further comprises sets of instructions for transcompiling the code from the first programming language to a second programming language.

12. The method of claim 11, wherein the first programming language is a strongly-typed programming language and wherein the second programming language is a weakly-typed programming language.

13. The method of claim 11, wherein the transcompiled code is configured for server-side execution on a computing device.

14. The method of claim 8, wherein, each data entity definition in the set of data entity definitions specifies a set of attributes and a set of data types associated with the set of attributes.

15. A system comprising:
- a set of processing units; and
- a non-transitory machine-readable medium storing instructions that when executed by at least one processing unit in the set of processing units cause the at least one processing unit to:
- receive a data model definition defined using a human-readable syntax, the data model definition including data entity definitions and service entity definitions comprising a function associated with a data entity definition, wherein the service entity definitions are defined in the data model definition in the human-readable syntax;
- generate a machine-readable representation of the data model definition;
- based on the data model definition, generate a set of interfaces from the machine-readable representation of the data model definition, each interface in the set of interfaces comprising code specified in a programming language, the set of interfaces including data entity interfaces and service entity interfaces,
- wherein said generating the set of interfaces includes, for each data entity definition in the data model definition, determining whether the data entity definition extends another data entity definition and when so determined configuring a generated interface to extend to another interface for the another data entity definition and,
- for each action in a service entity definition, generating a corresponding function in the programming language in a corresponding service entity interface; and
- provide the set of interfaces to an integrated development environment (IDE) application for design-time implementation of the set of interfaces;
- wherein the non-transitory machine-readable medium further comprises instructions for deploying the data model definition to a database, wherein deploying the data model definition to the database comprises, for each data entity definition in a set of data entity definitions specified in the data model definition, creating a table in the database comprising a set of columns, wherein each column in the set of column is for an attribute in the set of attributes specified in the data entity definition.

16. The system of claim 15, wherein the instructions further cause the at least one processing unit to receive, through the IDE, additional code specified in the programming language comprising a set of operations for an interface in the set of interfaces.

17. The system of claim 15, wherein the instructions further cause the at least one processing unit to:
- generate a namespace for the service entity definition that includes a façade interface; and
- receive, through the IDE, additional code from the programming language comprising a set of operations for the façade interface.

18. The system of claim 15, wherein the programing language is a first programming language, wherein the instructions further cause the at least one processing unit to transcompile the code from the first programming language to a second programming language.

19. The system of claim 18, wherein the first programming language is a strongly-typed programming language and wherein the second programming language is a weakly-typed programming language.

20. The system of claim 18, wherein the transcompiled code is configured for server-side execution on a computing device.

\* \* \* \* \*